US012118828B2

(12) United States Patent
Ren et al.

(10) Patent No.: US 12,118,828 B2
(45) Date of Patent: Oct. 15, 2024

(54) BLOCKCHAIN-BASED VOTING SYSTEM

(71) Applicant: Board of Trustees of Michigan State University, East Lansing, MI (US)

(72) Inventors: Jian Ren, Okemos, MI (US); Ehab Zaghloul, Chicago, IL (US); Tongtong Li, Okemos, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 0 days.

(21) Appl. No.: 18/016,981

(22) PCT Filed: Jun. 29, 2021

(86) PCT No.: PCT/US2021/039589
§ 371 (c)(1),
(2) Date: Jan. 19, 2023

(87) PCT Pub. No.: WO2022/020072
PCT Pub. Date: Jan. 27, 2022

(65) Prior Publication Data
US 2023/0282052 A1  Sep. 7, 2023

Related U.S. Application Data

(60) Provisional application No. 63/055,069, filed on Jul. 22, 2020.

(51) Int. Cl.
*G07C 13/00* (2006.01)
*H04L 9/00* (2022.01)
(Continued)

(52) U.S. Cl.
CPC ............ *G07C 13/00* (2013.01); *H04L 9/0631* (2013.01); *H04L 9/0819* (2013.01); *H04L 9/50* (2022.05)

(58) Field of Classification Search
CPC ..... G07C 13/00; H04L 9/0631; H04L 9/0819; H04L 9/50; H04L 2209/463;
(Continued)

(56) References Cited

U.S. PATENT DOCUMENTS 10,212,145 B2  2/2019  Chavez et al.
10,417,217 B2  9/2019  Pierce et al.
(Continued)

FOREIGN PATENT DOCUMENTS

CN  108109257 A  6/2018
CN  109558517 A  4/2019
(Continued)

OTHER PUBLICATIONS

International Search Report and Written Opinion of the ISA issued in PCT/US2021/039589, mailed Oct. 21, 2021; ISA/US, 9 pages.
(Continued)

*Primary Examiner* — Sonji N Johnson
(74) *Attorney, Agent, or Firm* — Harness, Dickey & Pierce, PLC

(57) ABSTRACT

A control system for conducting an election may include a voter client configured to be used by a voter to cast a vote for a candidate, a registrar server, and a moderator server. The moderator server may be configured to obscure the identity of the voter. The registrar server may be configured to randomly assign a ballot to the obscured voter. The registrar server may be configured to encrypt the ballot. The moderator server may be configured to transmit the encrypted ballot to the voter client. The voter client may be configured to decrypt the encrypted ballot to recover the ballot. The voter client, in response to the voter selecting a desired candidate, may be configured to generate a ballot associated with a vote. The voter client may be configured
(Continued)

to encrypt the ballot using a public key of the registrar server and a public key of the moderator server.

23 Claims, 14 Drawing Sheets

(51) Int. Cl.
*H04L 9/06* (2006.01)
*H04L 9/08* (2006.01)

(58) Field of Classification Search
CPC ... H04L 9/3218; H04L 9/3255; H04L 9/0869; H04L 9/3247; G06F 21/64; G06Q 10/00
See application file for complete search history.

(56) References Cited

U.S. PATENT DOCUMENTS

| | | | |
|---|---|---|---|
| 11,100,743 B1* | 8/2021 | Sealy | G07C 13/00 |
| 2003/0028423 A1* | 2/2003 | Neff | H04L 9/0844 705/12 |
| 2015/0310686 A1* | 10/2015 | Backert | G07C 13/00 705/12 |
| 2017/0085544 A1 | 3/2017 | Jamin et al. | |
| 2017/0085555 A1 | 3/2017 | Bisikalo et al. | |
| 2017/0109955 A1 | 4/2017 | Ernest et al. | |
| 2018/0176229 A1 | 6/2018 | Bathen et al. | |
| 2019/0005756 A1 | 1/2019 | Chaum | |
| 2019/0019366 A1* | 1/2019 | Chepel | H04L 9/3218 |
| 2019/0019367 A1 | 1/2019 | Unagami et al. | |
| 2019/0213821 A1 | 7/2019 | Davis | |

FOREIGN PATENT DOCUMENTS

| | | |
|---|---|---|
| CN | 110071800 A | 7/2019 |
| IN | 201711045129 A | 6/2019 |
| IN | 202011010499 | 3/2020 |

OTHER PUBLICATIONS

Yu et al, "Platform-independent Secure Blockchain-Based Voting System", Information Security. ISC 2018. Lecture Notes in Computer Science, vol. 11060. Springer, Cham. 2018.

Hardwick et al, "E-Voting with Blockchain—An E-Voting Protocol with Decentralisation and Voter Privacy", 2018 IEEE International Conference on Internet of Things (iThings) and IEEE Green Computing and Communications (GreenCom) and IEEE Cyber, Physical and Social Computing (CPSCom) and IEEE Smart Data (SmartData), Halifax, NS, Canada, 2018.

Dagher et al, "BroncoVote—Secure Voting System using Ethereum's Blockchain", In Proceedings of the 4th International Conference on Information Systems Security and Privacy (ICISSP 2018), pp. 96-107.

McCorry et al, "A Smart Contract for Boardroom Voting with Maximum Voter Privacy", Financial Cryptography and Data Security. Lecture Notes in Computer Science, vol. 10322. Springer, Cham. FC 2017.

Wang et al, "Large-scale Election Based on Blockchain", 2017 International Conference on Identification, Information and Knowledge in the Internet of Things, Procedia Computer Science 129 (2018) 234-237.

* cited by examiner

Vote Tallying

BLOCKCHAIN-BASED VOTING SYSTEM

CROSS-REFERENCE TO RELATED APPLICATIONS

This application is a 371 U.S. National Phase of International Application No. PCT/US2021/039589, filed Jun. 29, 2021, which claims the benefit of U.S. Provisional Application No. 63/055,069, filed on Jul. 22, 2020. The entire disclosures of the above applications are incorporated by reference herein.

GOVERNMENT SUPPORT

This invention was made with government support under CCF1919154 awarded by the National Science Foundation. The government has certain rights in the invention.

BACKGROUND AND SUMMARY

The present disclosure generally pertains to electronic voting control systems and more particularly to distributed blockchain-based anonymous mobile electronic voting systems.

More than half the world's countries are classified as democratic nations, employing governments that enforce and secure their democracies. These governments grant eligible members the ability to exercise their power by voting. However, guaranteeing that a democratic election is free and fair still remains a challenge for most governments. A free election should include a number of features. Before voting, proper voter registration is required to grant voting rights only to eligible voters. Voters should be able to remain anonymous, maintaining an election free of ballots that could be linked to their voters. Furthermore, to ensure that votes are tallied properly, verifiability should also be integrated to prove to everyone the legitimacy of the election results and avoid controversy. Concurrently, for an election to be fair, all eligible voters should have equal registration and ballot casting availability and accessibility regardless of any limitations such as geographical location or economic status. This means that voters that are unable to physically access their poll-sites, for example, absent personnel serving in the military, should be able to cast their ballots remotely while maintaining the equivalent requirements of a free election. A fair election should also maintain the secrecy of the cast ballots throughout the voting phase to prevent last-minutes voters from skewing the final count.

The majority of democratic elections are run or operated using in-person isolated poll-sites with rigorous monitoring in an effort to uphold a free and fair election. This requires voters to physically cast their ballots at predetermined public sites. The most widely utilized casting techniques include ballot box elections where voters insert their paper ballots into a box, scan them using optical scanners, or vote using a Direct-Recording Electronic (DRE) voting machine. While ballot box elections may cultivate some of the features of a free and fair election, they fall short in verifiability and require significant trust in the election organizers and talliers to behave honestly. While incorporating computerized systems such as optical scanners and DREs along with cryptographic primitives could help reduce the human factor intervention and may even offer verifiability, these systems still present computer vulnerabilities. The mandatory requirement of voting at a poll site using either technique interferes with the availability and accessibility fairness requirements and overall voter turnout.

In accordance with the present invention, a control system for conducting an election is provided. In another aspect, a control system for conducting an election may include a voter client configured to be used by a voter to cast a vote for a candidate, a registrar server, and a moderator server. A further aspect employs a registrar configured to generate a set of digital ballots and a moderator server configured to verify a voter public key transmitted from a voter client. The moderator server is configured to anonymize the voter by computing an obscured voter public key using a blind factor, the registrar server is configured to encrypt a ballot from the set of digital ballots, and the registrar server is configured to transmit the encrypted ballot and an ephemeral key to the moderator server. The moderator server is configured to generate an encrypted blind factor and is configured to transmit the encrypted ballot, the ephemeral key, and the encrypted blind factor to the voter client. A further aspect includes a method for conducting an election including encrypting, by a registrar server, a ballot to generate an encrypted ballot, transmitting, by the registrar server, the encrypted ballot to a moderator server, transmitting, by the moderator server, the encrypted ballot to a voter client, and decrypting, by the voter client, the encrypted ballot to recover the ballot. In response to the voter selecting a desired candidate, the method further includes generating, by the voter client, a ballot associated with a vote, and encrypting, by the voter client, the ballot associated with a vote using a public key of the registrar server and a public key of the moderator server. A further aspect includes voting computer program, stored in a non-transitory computer-readable medium, including programmed instructions for transmitting a voter public key to a moderator server, obscuring the identity of a voter by the moderator server, assigning a ballot to the obscured voter by a registrar server, encrypting the ballot by the registrar server, transmitting the encrypted ballot to the moderator server, transmitting the encrypted ballot to the voter client, decrypting the ballot by the voter client, generating a ballot associated with a vote by the voter client, and at least double-encrypting the ballot using a public key of the registrar server and the moderator server by the voter client.

In accordance with the present invention, a voting system is described that provides for free and fair large-scale elections. The system may leverage the existence of at least two parties of an election with different allegiances that engage in a multi-party computation along with the voters. The at least two parties of an election with different allegiances may be unlikely to collude or exchange any information during the election process that may sacrifice the winning chances of the candidates they support. All computations of the system may be performed remotely at the convenience of the parties involved. Voters may be able to cast their votes from a mobile device and verify whether their votes have been cast and counted properly. Voter verifiability may be based on randomly generated values that even if shared with coercers willingly, will not provide any information on how the voters have voted. The system may utilize a blockchain that acts as a publicly accessible bulletin board that voters cast and store their votes to. In some embodiments, no computations by the system are performed over the blockchain which may allow scalability and reduce cost of the system in large-scale elections.

Furthermore, the present system may be implemented in smartphones, which may advantageously result in increased voter turnout of the election process. The system is secure and may preserve voter privacy through secure multi-party computations performed by parties of differing allegiances.

The system may leverage a blockchain running smart contracts as a publicly accessible and tamper-resistant bulletin board to permanently store votes and prevent double-voting. The system may be secure against potential threats and may provide voter anonymity. The system may be practically used for large-scale elections. Additional advantages and features of the present system, methods, and apparatuses, will become apparent from the following description and claims as well as the appended drawings.

DETAILED DESCRIPTION

Large-scale elections typically involve at least two parties with conflicting allegiances competing to win an election. Relying on a single entity to conduct a free and fair election between those parties requires significant trust in that entity to be unbiased. The trusted entity is responsible for multiple imperative tasks. Initially, it must properly register eligible voters prior to the voting phase. Next, it must authenticate voters during the voting process and provide them with a secure and coercion-resistant voting space for voters to cast their desired votes freely. Once the voting phase is over, the trusted entity must also fairly tabulate all votes, discarding the invalid ones and finally announce the winning candidates.

Given these constraints, large-scale elections are usually run or operated using in-person poll-sites. However, this may result in reduced voter turnout. While incorporating absentee ballots may improve voter turnout, it requires more trust not just in the organizing entity, but also during vote transmission. Even with stringent audits and monitoring, the entity performing any of those tasks may be able to cheat. Therefore, the challenge is to provide a complete voting process that all voters and running candidates can trust. This process must allow eligible voters to cast their votes remotely from anywhere while securing the integrity of the election and the safety of the voters.

Figure 1:
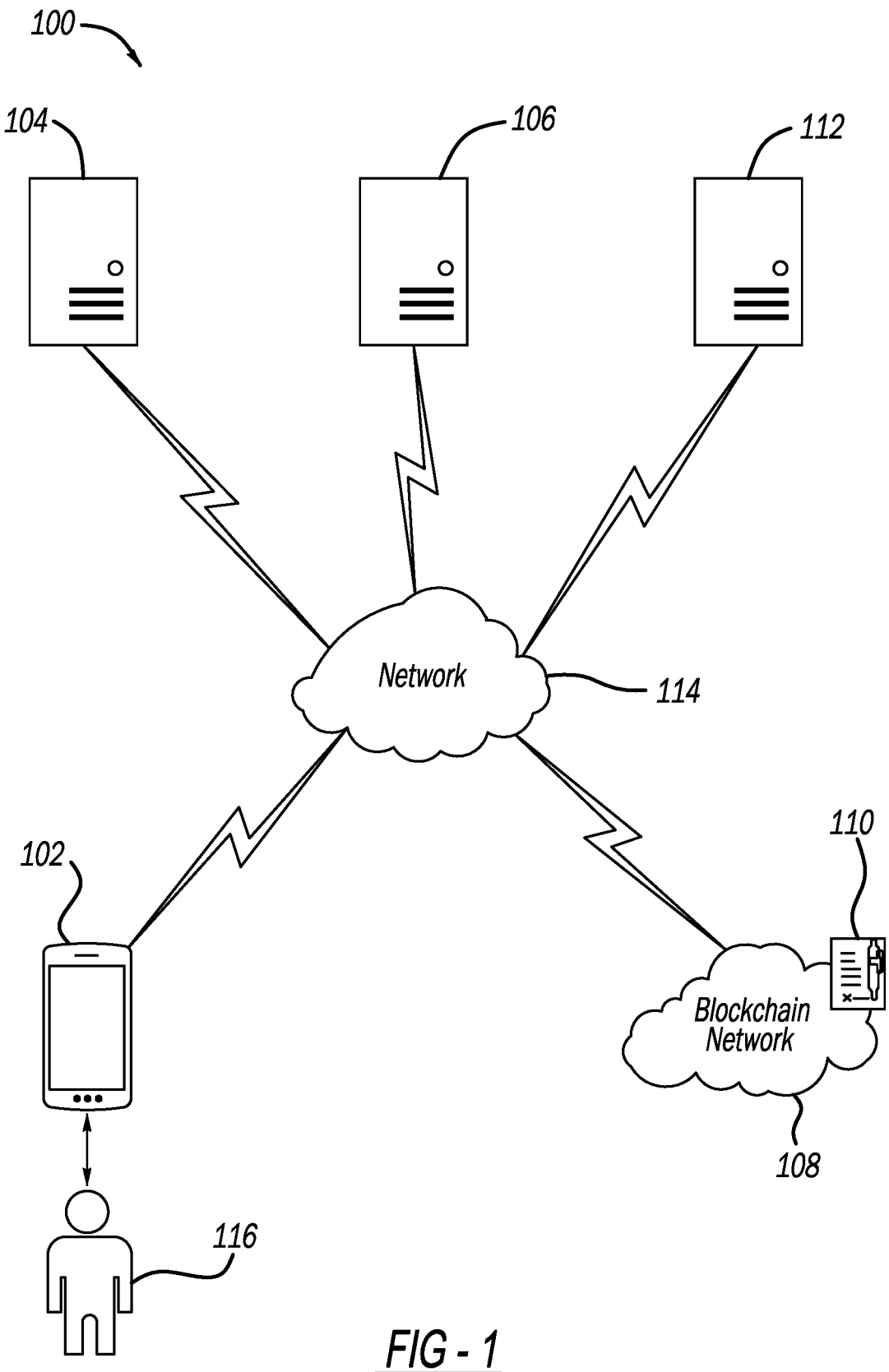
FIG. 1 is a diagrammatic illustration showing an embodiment of a control system for conducting an election via distributed blockchain-based anonymous mobile electronic voting.

FIG. 1 is a block diagram showing an embodiment of a control system 100 for conducting an election via distributed blockchain-based anonymous mobile electronic voting. The system 100 is configured to provide a number of benefits. For example, the system 100 is configured to distribute trust. An election may be organized by a registrar R and a moderator M with conflicting interests. Neither R nor M is fully trusted by all voters. However, due to the conflicting interests between them, they are unlikely to collude. Additionally, voting is limited to eligible voters. This requires proper voter registration that determines and confirms the eligibility of voters, granting them voting rights. The system 100 is resistant to double voting. Each eligible voter is entitled to only a single vote counted toward the election. While submitting multiple votes is permitted, only one vote will be counted toward the tallied results as predefined by the election. Additionally, the system 100 may provide anonymity to the voters. For example, in some embodiments, a cast vote cannot be linked to the identity of a voter. This protects voters, allowing them to freely voice their desired opinions. The system 100 may also be coercion-resistant. Remote voting may expose voters to coercion. If a voter is subject to coercion, the system 100 may be configured to provide voters the capability to trick the coercers into believing that they have voted as they have been ordered, whilst still protecting their actual votes. The system 100 may also be configured to allow voters to verify that their votes have been cast properly and counted toward the election results. The system 100 may also be configured to provide universal verifiability so that anyone can verify that all legitimate votes have been counted correctly. The system 100 may also be election result manipulation-resistant. For example, last-minute voters cannot manipulate the election results in a close race. The system 100 is able to conceal all votes until the voting phase is over. The system 100 further utilizes cryptographic operations to reduce or eliminate the impact of network adversaries. It is assumed that adversaries are capable of monitoring public communication channels and performing general network-level attacks. The system 100 builds on cryptographic operations limiting the impact of network adversaries to at most DoS attacks since all operations, such as ballot acquiring and vote casting, can all be verified by the voters. With continued reference to FIG. 1, the system 100 includes a voter client 102, a registrar server 104, a moderator server 106, a blockchain network 108, a vote smart contract 110, a tallying server 112, and a network 114.

One or more voters 116 interact with the system 100 to cast a vote using the voter client 102. The one or more voters 116 include the eligible set of voters $\{v_i \in V | 1 \le i \le n\}$ that are granted the right to cast a vote in an election. This set of voters 116 is public and subject to audits to prove to the public that only eligible voters can vote.

The system 100 allows voters to cast votes for one or more election candidates. The election candidates include the eligible set of candidates {cand$_k$∈C|1≤k≤m} running in an election. The candidates include, but are not limited to, persons running for an elected office, propositions, bond measures, constitutional amendments, or combinations thereof.

An election can be organized by a first organizing entity and a second organizing entity with conflicting interests. The first organizing entity is the registrar R and the second organizing entity is the moderator M. For example, the registrar and the moderator may be opposing political parties, such as, the Democrat and the Republican parties in the United States. Neither the registrar R nor the moderator M is fully trusted by all voters 116. However, due to the conflicting interests between them, they are unlikely to collude to influence the election.

The registrar has custody, possession, and/or control over the registrar server 104. The registrar server 104 generates unique and random digital ballots to be shared with voters 116 anonymously. The registrar server 104 cannot link a digital ballot to its assigned voter 116. The moderator has custody, possession, and/or control over the moderator server 106. The moderator server 106 conceals the identities of voters 116 and delivers the ballots to the voters 116 anonymously. The moderator server 106 cannot reveal the concealed digital ballots as it delivers them to the voters 116, hence, it cannot link a digital ballot to its assigned voter 116.

The blockchain network 108 is a non-trusted peer-to-peer network that maintains a publicly accessible blockchain and runs an election smart contract. The network nodes of the blockchain network 108 cannot link cast votes to voters 116 or differentiate between valid and invalid votes. In some embodiments, for example, the blockchain network may be the Ethereum blockchain. The Ethereum blockchain is an open source public ledger that stores cryptographically processed transactions performed over a peer-to-peer (P2P) network. Ethereum's P2P network acts as a Turing-complete virtual machine and is referred to as the Ethereum Virtual Machine (EVM). Transactions processed over the EVM include transferring Ethereum's cryptocurrency ETH and deploying and interacting with smart contracts. Smart contracts are pieces of code that define digital contracts between users to facilitate, verify, or enforce agreements. The P2P network nodes compete in a Proof-of-Work (PoW) competition to execute, validate, and group transactions into blocks to earn a transaction mining reward. PoW involves exhaustively searching for a nonce value in a hash crypto-puzzle in which the result is below a certain threshold. This competition is based on a dynamic difficulty and the chances of a node to win the competition are proportional to the node's computational power to execute the hashes. Ethereum's difficulty is continuously set so that the average time to perform PoW is 15 seconds. Once a node wins the competition, the transactions are permanently stored by extending the Ethereum blockchain shared with all the other nodes. Log entries can optionally be attached to transactions executed by the EVM. These logs represent the results of events fired from the smart contracts. In some embodiments, the blockchain network 108 of the system 100 may be the Hyperledger Fabric blockchain. In some embodiments, the blockchain network 108 of the system 100 may be the Trifecta blockchain.

The tallying server 112 may be in the custody, possession, and/or control of a tallying authority. The tallying authority is the party that performs vote tabulation at the end of a vote casting phase. This task is performed and monitored publicly and therefore does not require any trust. The tallying authority may be, for example, a state or county election board.

The network 114 permits communication between and/or among the voter client 102, the registrar server 104, the moderator server 106, the blockchain network 108, and the tallying server 112. The network 114 may include wired networks, wireless networks, or combinations thereof. The wireless network may be a cellular telephone network, an 802.11, 802.16, 802.20, or WiMAX network. Further, the network 114 may be a public network, such as the Internet, a private network, such as an intranet, or combinations thereof, and may utilize a variety of networking protocols now available or later developed including, but not limited to, TCP/IP based networking protocols. In some embodiments, the network 114 may be a peer-to-peer network. The voter client 102, the registrar server 104, the moderator server 106, the blockchain network 108, and the tallying server 112 are configured to communicate with one another via the network 114.

Figure 2:
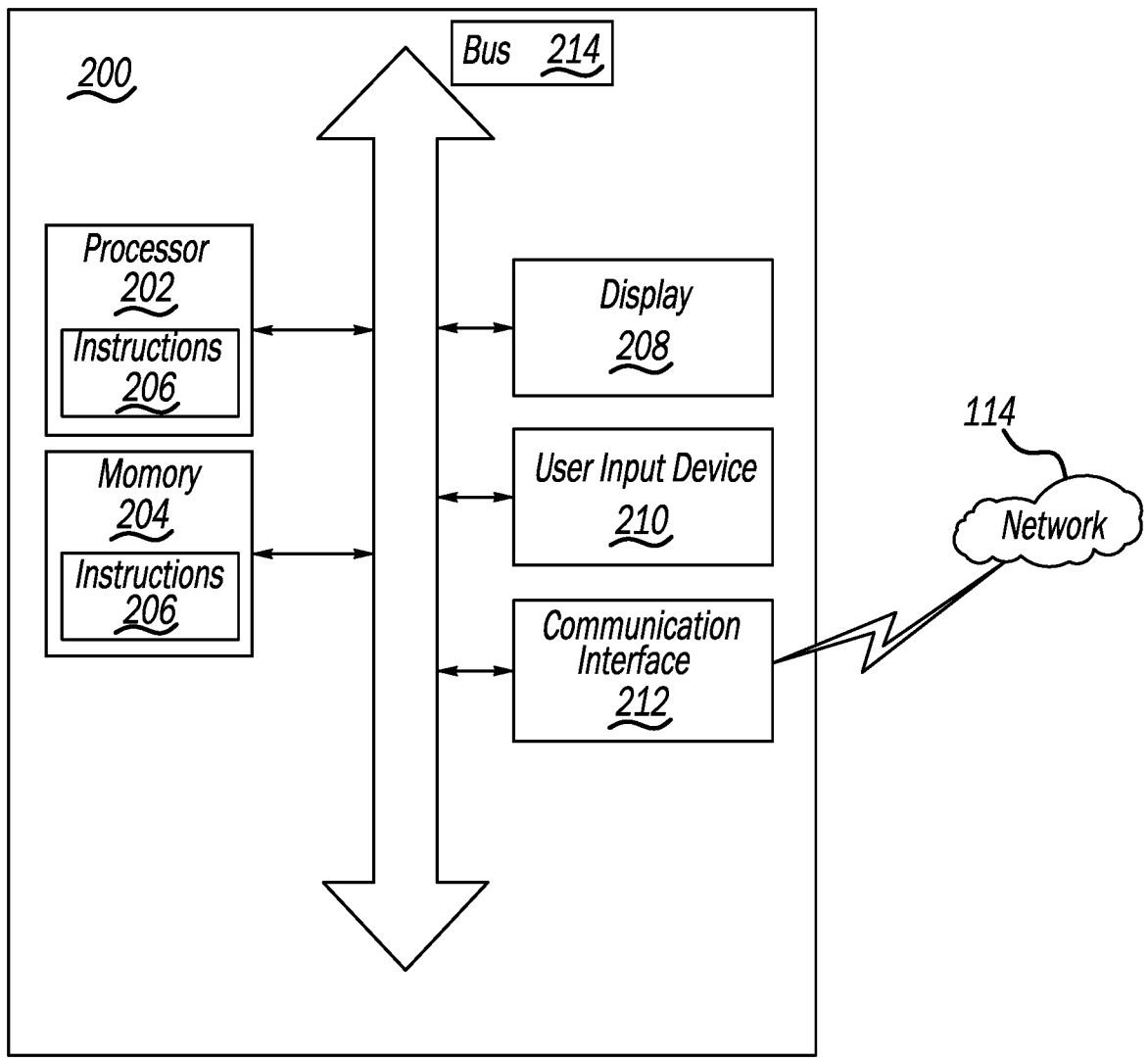
FIG. 2 is a block diagram showing an embodiment of a general computer system that may be used in the system of FIG. 1.

Each of the voter client 102, registrar server 104, moderator server 106, and tallying server 112 are computing devices, which include a computer system 200 described in more detail with respect to FIG. 2, including a central processor, specifically configured or otherwise, that controls the overall operation of the computer and a system bus that connects the central processor to one or more conventional components, such as a communication interface. Each of the voter client 102, registrar server 104, moderator server 106, and tallying server 112 include a variety of interface units and memory for reading and writing data or files and communicating with other computing devices and with the election system 100. Depending on the type of computing device, a user may interact with the computer with a keyboard, pointing device, touch device, microphone, pen device or other input devices.

The system 100 is assumed to be secure under the decisional Diffie-Hellman (DDH) assumption. The DDH assumption is a computational hardness assumption and is defined as follows: Let $\mathbb{G}$ be a group of prime order p, g be a generator, and a,b,c∈$Z_p^*$ be chosen at random. It is infeasible for the adversary to distinguish between any given $(g,g^a,g^b,g^{ab})$ and $(g,g^a,g^b,g^c)$ i.e., an algorithm $\mathcal{A}$ that outputs a guess c=ab, has advantage ε in solving the DDH problem in $\mathbb{G}$ if:

$$|Pr[\mathcal{A}/(g,g^a,g^b,g^{ab})=1]-Pr[\mathcal{A}(g,g^a,g^b,g^c)=1]|>\varepsilon, \quad (1)$$

where the value 1 denotes true. The DDH assumption holds if no probabilistic polynomial time (PPT) algorithm has a non-negligible advantage in solving the DDH problem.

FIG. 2 is a block diagram of an embodiment of a general computer system 200 used in the system 100 of FIG. 1. The computer system 200 includes a set of instructions that are configured to be executed to cause the computer system 200 to perform any one or more of the methods or computer-based functions disclosed herein. The computer system 200 may operate as a standalone device or may be connected, for example, via the network 114, to other computer systems or peripheral devices. Any of the components discussed above, such as the voter client 102, registrar server 104, moderator server 106, tallying server 112, may be a computer system 200 or a component in the computer system 200. The computer system 200 may be specifically configured to implement at least a portion of an electronic election as described herein.

In a networked deployment, the computer system 200 may operate in the capacity of a server or as a client user computer in a client-server user network environment, or as a peer computer system in a peer-to-peer (or distributed) network environment. The computer system 200 may also be implemented as or incorporated into various devices, such as a personal computer (PC), a tablet, a personal digital assistant (PDA), a mobile device, a smartphone, a palmtop computer, a laptop computer, a desktop computer, a communications device, a wireless telephone, a control system, or any other machine capable of executing a set of instructions (sequential or otherwise) that specify actions to be taken by that device. Further, while a single computer system 200 is illustrated, the term "system" shall also be taken to include any collection of systems or sub-systems that individually or jointly execute a set, or multiple sets, of instructions to perform one or more computer functions.

As shown in FIG. 2, the computer system 200 includes a processor 202, memory 204, instructions 206, a display 208, a user input device 210, a communication interface 212, and a bus 214. The bus 214 provides data communication between the processor 202, the memory 204, the display 208, the user input device 210, and the communication interface 212.

The processor 202 may include a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, specifically configured processors, application-specific integrated circuits, field-programmable gate arrays, servers, networks, digital circuits, analog circuits, combinations thereof, or other now known or later developed devices for analyzing and processing data. The processor 202 implements a software program or application, such as code generated manually (i.e., programmed). The processor 202 also may include computer-readable media.

The memory 204 includes a computer-readable medium in which one or more sets of instructions 206, such as for example, software, are embedded. The memory 204 may be a main memory, a static memory, or a dynamic memory. The memory 204 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. The memory 204 may include a cache or random-access memory for the processor 202. In some embodiments, the memory 204 may be separate from the processor 202, such as a cache memory of a processor, the system memory, or other memory. The memory 204 may include an external storage device or database for storing data, such as, for example, a hard drive, compact disc, digital versatile disc, memory card, memory stick, floppy disk, universal serial bus memory device, or any other device operative to store data. The memory 204 is operable to store instructions 206 executable by the processor 202.

The steps, functions, tasks, or calculations shown in the figures or described herein may be performed by the programmed processor 202 executing the instructions 206 stored in the memory 204. The instructions 206 may embody one or more of the methods or logic as described herein. In some embodiments, the instructions 206 may reside completely, or at least partially, within the memory 204 and/or within the processor 202 during execution by the computer system 200. The steps, functions, tasks, or calculations are independent of the particular type of instructions set, storage media, processor or processing strategy and may be performed by software, hardware, integrated circuits, firmware, micro-code and the like, operating alone or in combination. Various processing strategies may include multiprocessing, multitasking, parallel processing and the like. The system 100 includes a voting computer program, stored in a non-transitory computer-readable medium, the voting computer program comprising the programmed instructions 206. In some embodiments, instructions 206 are stored in the voter client 102, the registrar server 104, the moderator server 106, and the tallying server 112. For example, in some embodiments, a first set of instructions 206 are stored on the cover client, a second set of instructions 206 are stored on the moderator server 106, a third set of instructions 206 are stored on the registrar server 104, and a fourth set of instructions 206 are stored on the tallying server 112. The first, second, third, and fourth set of instructions 206 are programmed to operate in coordination to conduct and control an election.

The display 208 serves as an interface for the user to monitor the functioning of the processor 202 or as an interface with the software stored in the memory 204. The display 208 may include a liquid-crystal display (LCD), a light emitting diode (OLED) display, a flat panel display, a solid-state display, a cathode ray tube (CRT), a projector, or other now known or later developed display device for outputting determined information.

The user input device 210 is configured to allow a user to interact with any of the components of the computer system 200. The user input device 210 may include one or more of a number pad, a keyboard, a cursor control device, such as a mouse, or a joystick, a touch screen display, a remote control or any other device operative to interact with the computer system 200.

The communication interface 212 may be a part of the processor 202 or may be a separate component. The communication interface 212 may be created in software or may be a physical connection in hardware. The communication interface 212 is configured to connect with the network 114, external media, the display 208, or any other components in the system 100, or combinations thereof. The connection with the network 114 may be a physical connection, such as a wired Ethernet connection or may be established wirelessly. The connections with other components of the system 100 may be physical connections or wireless connections. The present disclosure contemplates a computer-readable medium that includes the instructions 206 or receives and executes the instructions 206 responsive to a propagated signal, so that a device connected to the network 114 may communicate voice, video, audio, images or any other data over the network 114. Further, the instructions 206 may be transmitted or received over the network 114 via the communication interface 212.

Embodiments of the subject matter and the functional operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer program products, i.e., one or more modules of computer program instructions encoded on a computer readable medium for execution by, or to control the operation of, data processing apparatus. The term "computer-readable medium" includes a single-medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer-readable medium may be a machine-readable storage device, a machine-readable storage substrate, a memory device, or a combination of one or more of them.

In accordance with various embodiments, the methods described herein may be implemented by software programs executable by the voter client 102, the registrar server 104, the moderator server 106, and/or the tallying server 112. A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program may be deployed to be executed on one computer or on multiple computers that are located at one site or distributed across multiple sites and interconnected by a communication network. The processes and logic flows described in this specification may be performed by one or more programmable processors executing one or more computer programs to perform functions by operating on input data and generating output.

Figure 3:
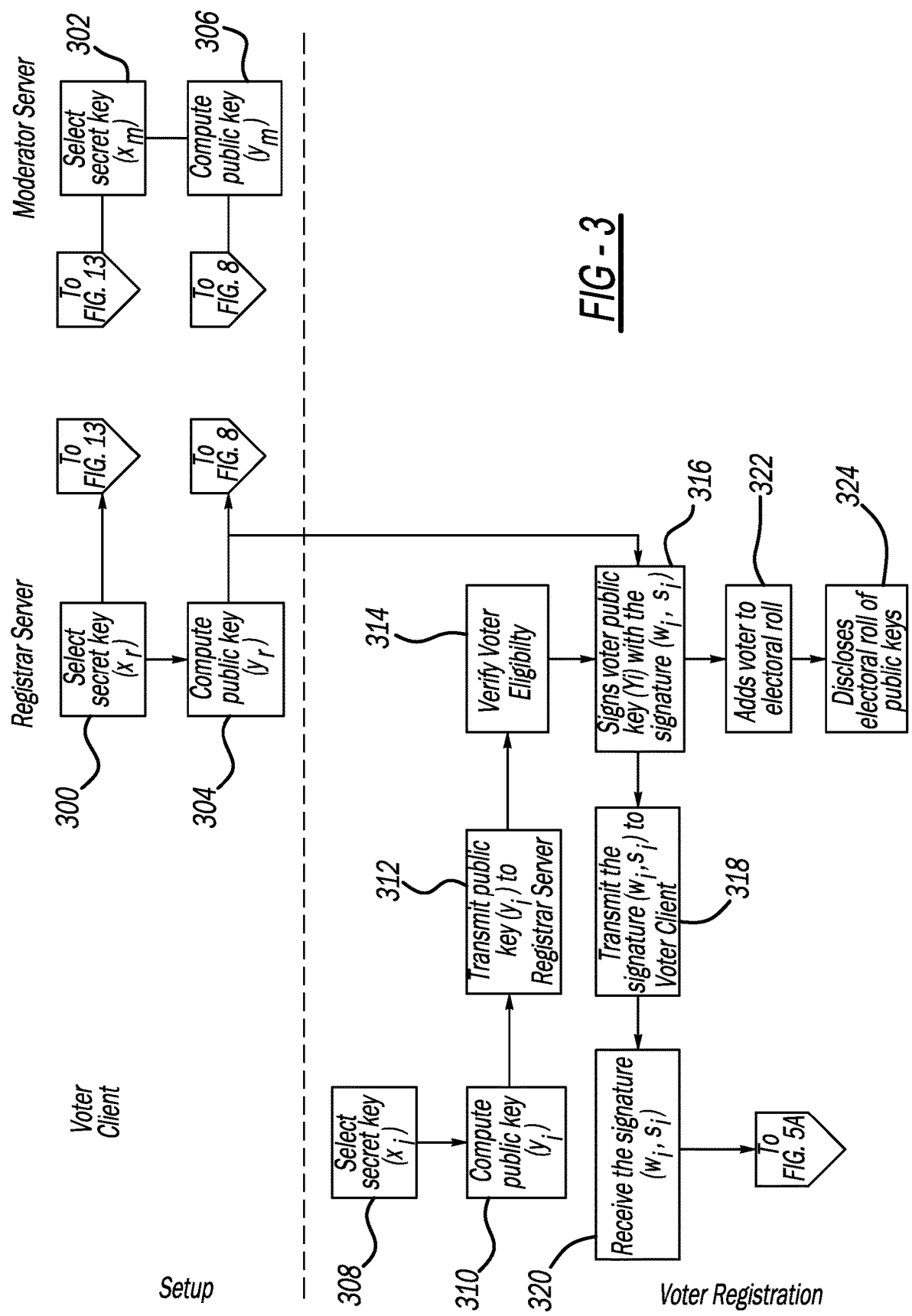
FIG. 3 is a flowchart illustrating an embodiment of an election setup phase and a voter registration phase conducted by the system of FIG. 1.

The system 100 may include six phases, occurring in a time frame predefined by the election organizer. Let $\mathbb{G}$ be a publicly chosen multiplicative cyclic group of prime order p and g is a generator of $\mathbb{G}$. A flowchart illustrating an embodiment of an election setup phase and a voter registration phase conducted by the system 100 is shown in FIG. 3. In some embodiments, the setup phase is conducted before each election cycle. During the setup phase, the registrar server 104 and the moderator server 106 each generate a key pair. At step 300, the registrar server 104 randomly selects a registrar secret key $x_r \in \mathbb{Z}_p^*$. At step 302 the moderator server 106 randomly selects a moderator secret key $x_m \in \mathbb{Z}_p^*$. At step 304, the registrar server 104 computes a registrar public key as $y_r = g^{x_r} (\bmod\ p)$. At step 306, the moderator server 106 computes a moderator public key as $y_m = g^{x_m} (\bmod\ p)$.

In the voter registration phase, voters 116 are required to prove their voting eligibility to the registrar by providing evidence such as their identities. After validation, voters are added to the electoral roll. In some embodiments, the voter registration phase is performed only once for each voter. For example, once a voter 116 registers to vote, their registration may be valid for any subsequent election. The voter 116 may not be required to register for each election. In some embodiments, the voter registration phase is performed before each election such that the voter 116 must re-register for each election.

Each voter 116 that desires to register as a voter interacts with the voter client 102 to initiate the registration process. At step 308, the voter client 102 randomly selects a voter secret key $x_i \in \mathbb{Z}_p^*$ for the voter 116 ($v_i$) and then at step 310 computes the corresponding voter public key as $y_i = g^{x_i} (\bmod\ p)$. At step 312, the voter client 102 transmits the voter public key ($y_i$) for the voter 116 ($v_i$) to the registrar server 104. The voter public key ($y_i$) may be transmitted from the voter client 102 to the registrar server 104 via the network 114. At step 314, after receiving the voter public key ($y_i$), the registrar server 104 verifies the eligibility of the voter 116 by checking the voter registration information. If the voter 116 is eligible to register, at step 316, the registrar server 104 signs the voter public key ($y_i$) using the registrar public key ($y_r$) computed at step 304 and generates signature ($w_i, s_i$). The registrar server 104 randomly selects $u_i$ where $1 < u_i < p-1$ and $\gcd(u_i, p-1) = 1$ then computes the following:

$$w_i = g^{u_i}(\bmod\ p), \tag{2}$$

$$s_i = (h(y_i) - x_r w_i) u_i^{-1}(\bmod\ p), \tag{3}$$

where h is a hash function. At step 318, the registrar server 104 transmits the signature ($w_i, s_i$) to the voter client 102. The signature ($w_i, s_i$) may be transmitted from the registrar server 104 to the voter client 102 via the network 114. At step 320, the voter client 102 receives the signature ($w_i, s_i$) for the particular voter 116 ($v_i$). At step 322, the registrar server adds the voter 116 to the electoral roll. Steps 308 through 322 may occur for each voter 116 ($v_i$) that registers to vote. Each voter 116 ($v_i$) obtains their own voter secret key ($x_i$), voter public key ($y_i$), and signature ($w_i, s_i$). At step 324, the registrar server 104 may disclose the electoral roll of public keys once registration is complete. In some embodiments, step 324 may occur after all voters have registered, for example, after the deadline to register for a particular election. In other embodiments, step 324 may occur after each voter 116 ($v_i$) is added to the electoral roll at step 322.

Figure 4:
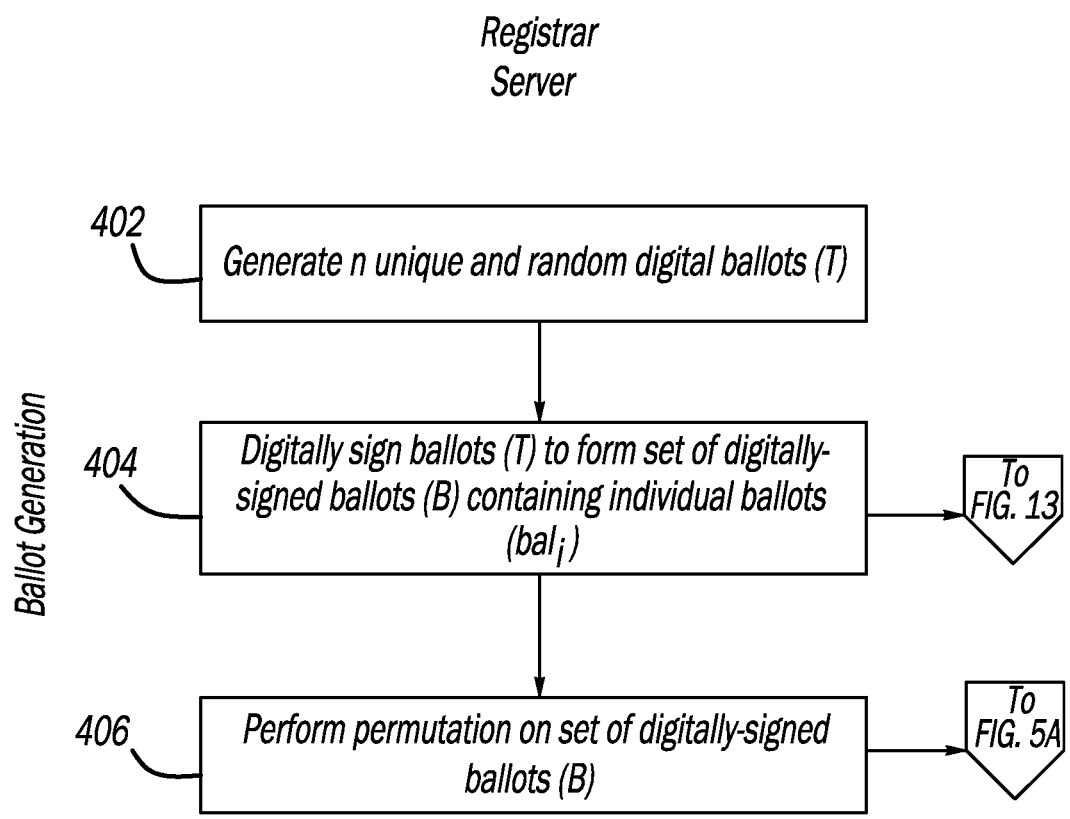
FIG. 4 is a flowchart illustrating an embodiment of a ballot generation phase conducted by the system of FIG. 1.

Now with reference to FIG. 4, a flowchart of an embodiment of a ballot generation phase conducted by the system 100 is illustrated. At step 402, the registrar server 104 generates n unique and random digital ballots $\mathcal{T} = \{t_i | i \in \mathbb{Z}_n\}$, where n is equal to the total number of registered voters 116. The digital ballots will contain all of the candidates up for a vote in the election. At step 404, the registrar server 104 then digitally signs the ballots using the ElGamal signature scheme. The set of digitally-signed ballots may be denoted as $\mathcal{B} = \{bal_i = \text{EG-Sign}(t_i) | i \in \mathbb{Z}_n\}$. At step 406, the registrar server 104 performs a permutation $\pi$ on the digitally-signed ballots ($\mathcal{B}$) such that: $\pi: \mathcal{B} \rightarrow \mathcal{B}$.

Figure 5A:
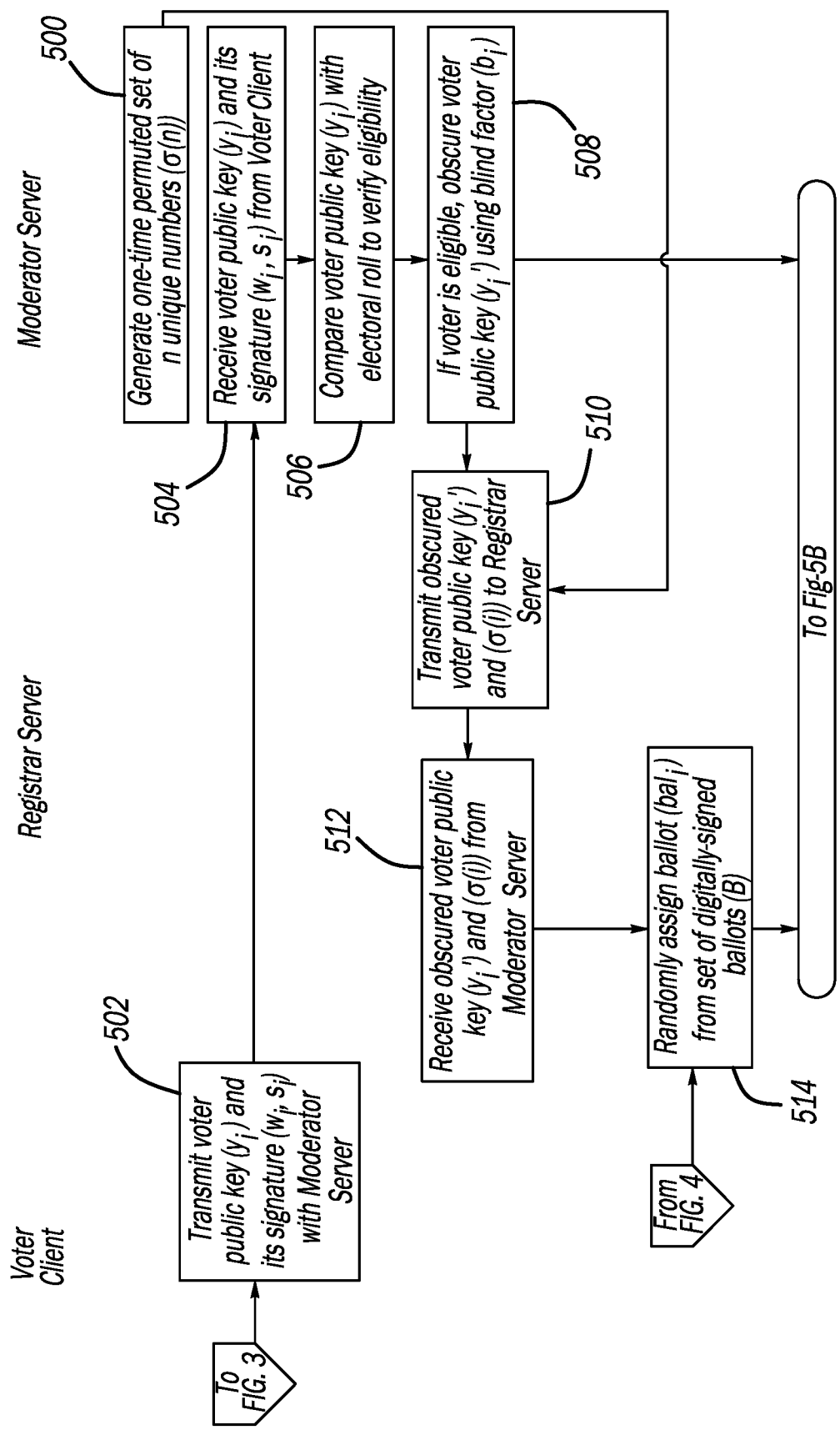
FIGS. 5A and 5B are flowcharts illustrating an embodiment of a ballot acquisition phase conducted by the system of FIG. 1.
Figure 5B:
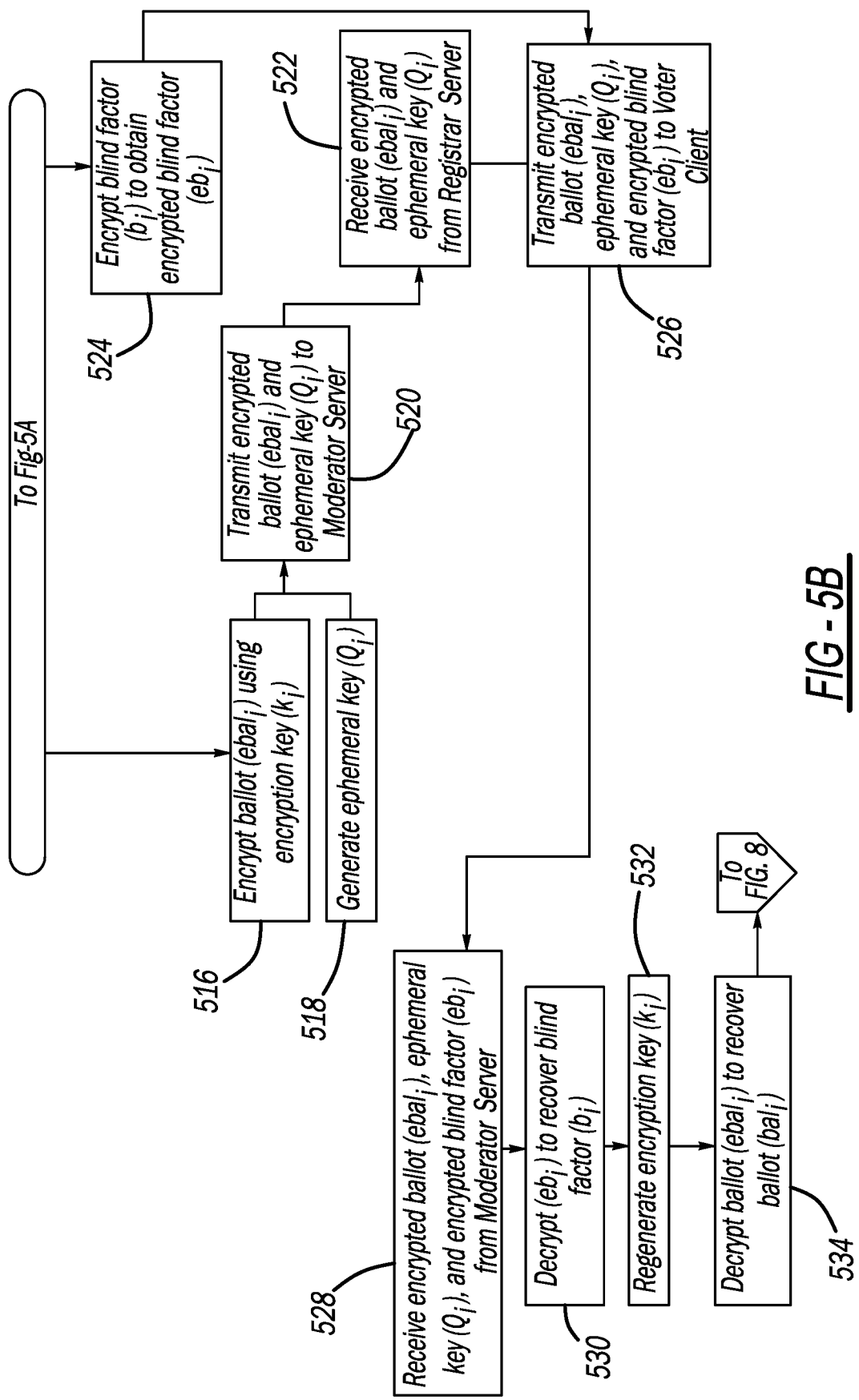

FIGS. 5A and 5B are flowcharts illustrating an embodiment of a ballot acquisition phase conducted by the system 100. The moderator server 106 conceals voter identities from the registrar server 104 during ballot distribution. At step 500, the moderator server 106 generates a one-time permuted set $\sigma$ of n unique numbers used with every voter ballot request such that: $\sigma: \mathbb{Z}_n \rightarrow \mathbb{Z}_n$, where n is equal to the number of registered voters. At or near when polling for the election opens, each voter 116 that desires to vote in the election may interact with the voter client 102 to acquire a ballot. In some embodiments, in response to the voter 116 interacting with the voter client 102 to request a ballot, at step 502, the voter client 102 transmits to the moderator server 106 the voter public key ($y_i$) and its signature ($w_i, s_i$) that the voter client 102 received at step 320 (see FIG. 3). The voter public key ($y_i$) and its signature ($w_i, s_i$) may be transmitted from the voter client 102 to the moderator server 106 via the network 114. At step 504, the moderator server 106 receives the voter public key ($y_i$) and its signature ($w_i, s_i$). At step 506, the moderator server 106 compares the voter public key ($y_i$) with the electoral roll list to verify eligibility of the voter 116 ($v_i$). The moderator server 106 validates the signature ($w_i, s_i$) corresponding to the voter public key ($y_i$) by verifying whether the following equation:

$$g^{h(y_i)} = y_r^{w_i} \cdot w_i^{s_i}(\bmod\ p), \tag{4}$$

holds true. If the equation (4) is true, such that the voter 116 is eligible to vote, at step 508, the moderator server 106 anonymizes the voter 116 by obscuring the voter public key $y_i$ by randomly selecting a blind factor $b_i \in \mathbb{Z}_p^*$ and computing the following:

$$y_i' = y_i^{b_i} = g^{x_i b_i} (\bmod\ p). \tag{5}$$

By obscuring the voter public key $y_i$, no person or entity is able to link a ballot to a voter. At step 510, the moderator server 106 then transmits the obscured voter's public key ($y_i'$) and the permuted number σ(i) generated at step 500 to the registrar server 104. The obscured voter's public key ($y_i'$) and the permuted number σ(i) may be transmitted from the moderator server 106 to the registrar server 104 via the network 114. At step 512, the registrar server 104 receives the obscured voter's public key ($y_i'$) and the permuted number σ(i) from the moderator server 106.

At step 514, the registrar server 104 randomly assigns ballots ($bal_i$) to the blinded voters 116 from the set of permutated digitally-signed ballots (B) from step 406 (see FIG. 4) as follows:

$$bal_i = \pi(\sigma(i)). \tag{6}$$

To conceal the assigned ballot ($bal_i$), at step 516 shown in FIG. 5B, the registrar server 104 encrypts it under an encryption key ($k_i$) derived as:

$$k_i = (y_i')^{q_i} = g^{x_i b_i q_i} (\bmod\ p), \tag{7}$$

where $q_i \in \mathbb{Z}_p^*$ is selected randomly. Using the encryption key ($k_i$), the registrar server 104 encrypts the ballot as the following:

$$ebal_i = \text{AES-Enc}_{k_i}(bal_i), \tag{8}$$

where AES-Enc is the AES encryption function. In some embodiments, the ElGamal key size may be 1024 bits. In some embodiments, the ElGamal key size may be 1536 bits. In some embodiments, the ElGamal key size may be 2048 bits. In some embodiments, the ElGamal key size may be 2560 bits. In some embodiments, the ElGamal key size may be 4096 bits. The ElGamal key size may range from 1024 bits to 4096 bits. In some embodiments, the ElGamal key size may be greater than 4096 bits. The purpose of this encryption is to conceal the ballot from the moderator. It enables the registrar to share this ballot with the voter 116 anonymously. For this purpose, at step 518, the registrar server 104 generates an ephemeral key ($Q_i$) that would allow the voter client 102 to regenerate the encryption key ($k_i$) such that:

$$Q_i = g^{q_i} (\bmod\ p). \tag{9}$$

At step 520, the registrar server 104 transmits the encrypted ballot ($ebal_i$) and the ephemeral key ($Q_i$) to the moderator server 106. The encrypted ballot ($ebal_i$) and the ephemeral key ($Q_i$) may be transmitted from the registrar server 104 to the moderator server 106 via the network 114. At step 522, the moderator server 106 receives the encrypted ballot ($ebal_i$) and the ephemeral key ($Q_i$) from the registrar server 106.

At step 524, the moderator server 106 encrypts the blind factor ($b_i$) selected at step 508 as:

$$eb_i = (g^{r_m}, b_i \cdot y_i^{r_m}) = (c_1, c_2), \tag{10}$$

where $r_m \in \mathbb{Z}_p^*$ is selected randomly. At step 526, the moderator server 106 transmits to the voter 116 ($v_i$) the encrypted ballot ($ebal_i$), the ephemeral key ($Q_i$), and the encrypted the blind factor ($eb_i$). The encrypted ballot ($ebal_i$), the ephemeral key ($Q_i$), and the encrypted the blind factor ($eb_i$) may be transmitted from the moderator server 106 to the voter client 102 ($v_i$) via the network 114. At step 528, the voter client 102 receives the encrypted ballot ($ebal_i$), the ephemeral key ($Q_i$), and the encrypted the blind factor ($eb_i$) from the moderator server 106. At step 530, the voter client 102 decrypts the encrypted blind factor ($eb_i$) and recover the blind factor ($b_i$) as:

$$b_i = c_2 \cdot c_1^{-x_i} = b_i \cdot y_i^{r_m} \cdot (g^{r_m})^{-x_i}. \tag{11}$$

At step 532, the voter client 102 regenerates the ballot encryption key ($k_i$) as:

$$k_i = (Q_i)^{x_i b_i} = g^{q_i x_i b_i} (\bmod\ p). \tag{12}$$

At step 534, the voter client 102 decrypts the encrypted ballot ($ebal_i$) to recover the unencrypted ballot as:

$$bal_i = \text{AES-Dec}_{k_i}(ebal_i), \tag{13}$$

where AES-Dec is the AES decryption function.

Figure 6:
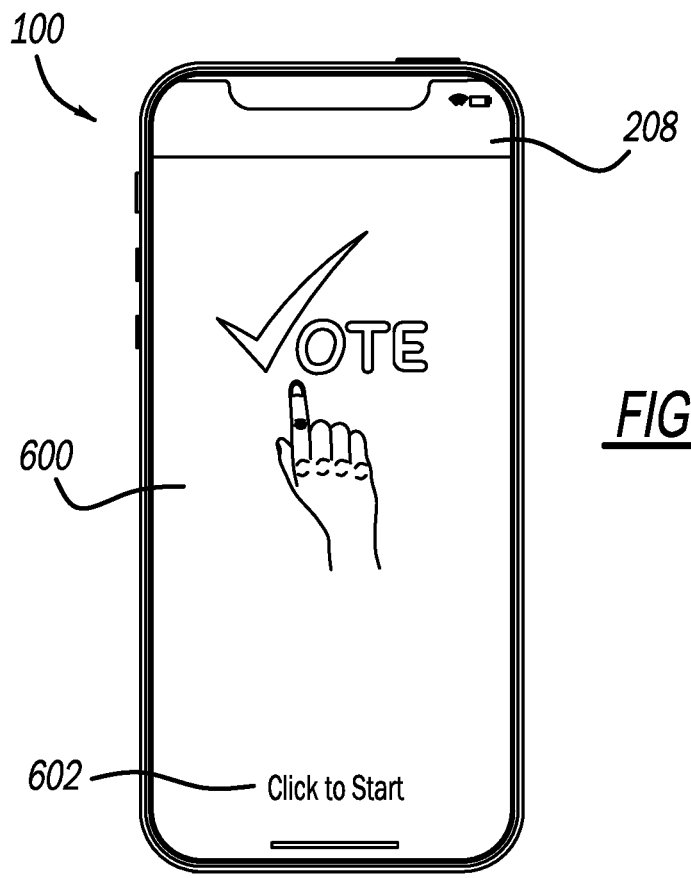
FIG. 6 is an image of an example graphical user interface of a software application on a voter client.

FIG. 6 shows an example graphical user interface of a software application on the voter client 102. The graphical user interface may be displayed on the display 208 on the voter client 102. In some embodiments, the user input device 210 of the voter client 102 may be a touchscreen. The graphical user interface of FIG. 6 may be an application start screen 600 that includes one or more user interface elements.

The user interface elements may include digital images, video, graphics, text, icons, and control elements, such as for example, buttons. As shown in FIG. 6, the user interface element may be a control element 602 labeled, for example, "Click to Start." In response to the voter 116 manipulating the control element 602, the voter client 102 may initiate steps 502 through 534 of FIG. 5 to request a ballot. In some embodiments, the voter client 102 may be programmed to initiate some or all of steps 502 through 534 of FIG. to acquire a ballot without any input by a voter 116. For example, the voter client 102 may be programmed such that when the polls open, the voter client 102 will initiate steps 502 through 534 in the background such that when a voter 116 manipulates the control element 602, the voter client 102 will allow the voter 116 to cast their ballot with little or no delay.

Figure 7:
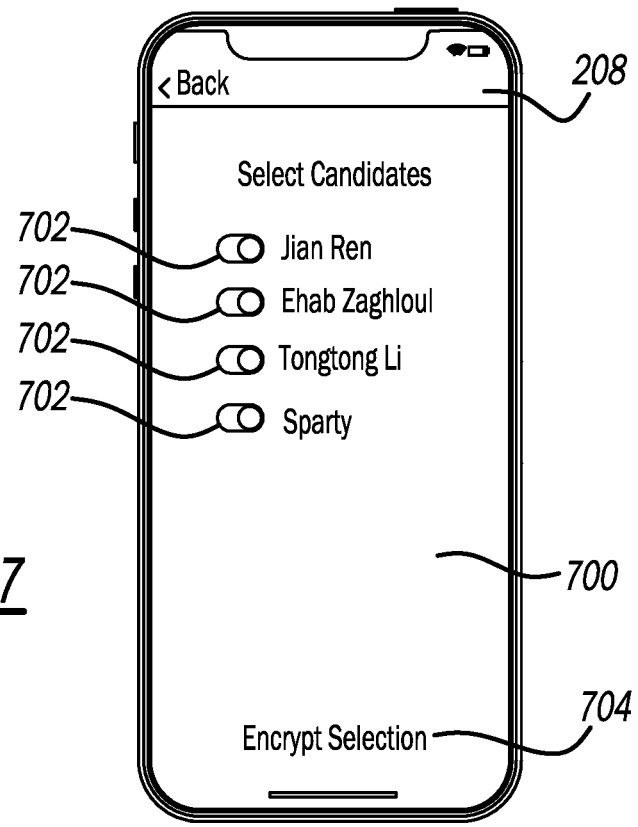
FIG. 7 is an image of an example graphical user interface of a software application on the voter client.

FIG. 7 shows another example graphical user interface of a software application on the voter client 102. The graphical user interface of FIG. 7 may be a ballot screen 700 representing the digital ballot (bait) decrypted by the voter client at step 534 of FIG. 5. The ballot screen 700 may be displayed on the display 208 on the voter client 102 in response to the voter 116 manipulating the control element 602 of FIG. 6 and following the completion of ballot decryption at step 534 of FIG. 5. The voter client 102 may be configured to display one or more user interface elements to the voter 116 to allow the voter 116 to vote for a desired candidate. For example, the ballot screen 700 may identify the candidates up for election and may include one or more user interface elements, such as control elements 702, associated with each candidate. The voter 116 may manipulate the control element 702 to cast their vote for the candidate. As shown in FIG. 7, in some embodiments, the control element 702 may be a two-position slider that allows the voter 116 to vote Yes or No for a candidate. In some embodiments, the control element 702 may include, but is not limited to, a checkbox, a radio button, and one or more buttons. In some embodiments, the control element 702 may include text and/or graphical labels, such as for example "Yes," "No," "For," "Against," a thumbs up graphic, or a thumbs down graphic. The ballot screen 700 may include a scrolling capability and or may include multiple screens to allow the voter 116 to view the entire ballot and to cast a vote for all the candidates. The ballot screen 700 may also include another user interface element, such as control element 704 labeled, for example, "Encrypt Selection." The control element 704 may be a button that, when manipulated, causes the voter's 116 selections to be encrypted. Thus, once the voter 116 has cast their votes, the voter 116 may manipulate the control element 704 to initiate encryption of their selections.

Figure 8:
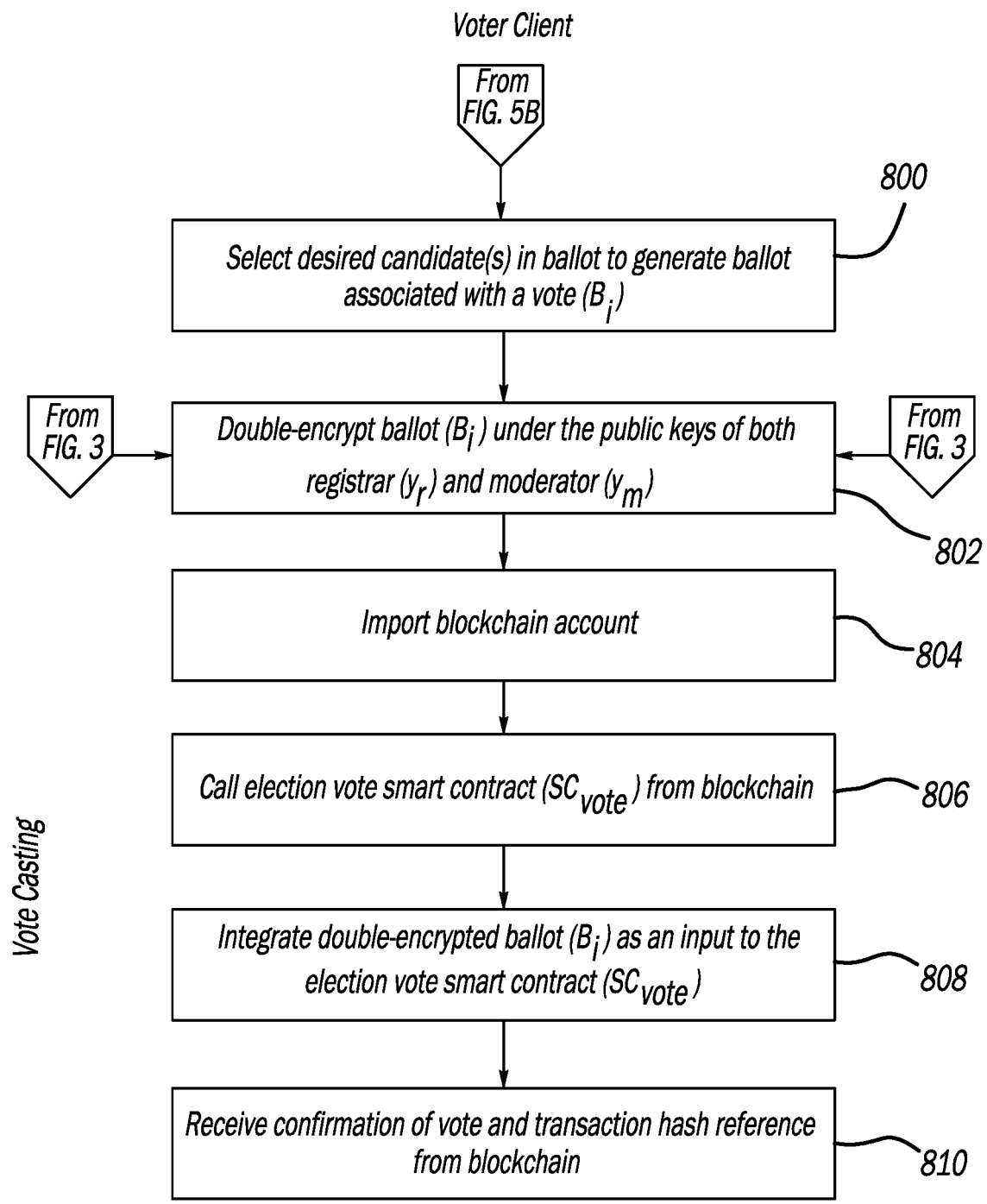
FIG. 8 is a flowchart illustrating an embodiment of a vote casting phase conducted by the system of FIG. 1.

A flowchart of an embodiment of a vote casting phase conducted by the system 100 is shown in FIG. 8. In response to the voter 116 making their desired candidate selections using control elements 702 in the voter client 102, the voter client 102, at step 800, generates a ballot associated with the voter's 116 vote, denoted as $B_i$.

In response to the voter 116 manipulating the control element 704 to initiate encryption of their selections, the voter client 102, at step 802, double encrypts the ballot associated with a vote ($B_i$) under the public keys $y_r$ and $y_m$ of both the registrar server 104 and the moderator server 106 (computed at steps 304 and 306 of FIG. 3, respectively) as:

$$B_i=(g^v,T\cdot(y_r\cdot y_m)^v)=(c_3,c_4), \quad (14)$$

where $v\in \mathbb{Z}_p^*$ is selected randomly, $T=bal_i\|Vote)$, and Vote= $(cand_1, cand_2, \ldots, cand_m)$ is a sequence of bits representing each candidate such that:

$$cand_k = \begin{cases} 1, & \text{if voting for } cand_k, \\ 0, & \text{if voting against } cand_k \end{cases}. \quad (15)$$

In some embodiments, the voter client 102 may be configured to encrypt the ballot beyond double encryption. For example, in some embodiments, the voter client 102 may be configured to triple encrypt the ballot using a public key from another entity, such as the tallying authority. In some embodiments, the voter client 102 may use additional public keys from other entities to increase the encryption of the ballot.

At step 804, the voter client 102 prompts the voter 116 to import their blockchain account to allow the voter client 102 to call the casting smart contract deployed over the blockchain. Importing the blockchain account may include the voter 116 entering a password into the voter client 102. At step 806, to submit the encrypted ballot ($B_i$), the voter client 102 connects with the blockchain network 108 and calls the election vote smart contract $SC_{vote}$ 110 from the blockchain network 108. At step 808, the voter client 102 integrates the double-encrypted ballot ($B_i$) as an input to the election vote smart contract $SC_{vote}$ 110. A vote is permanently cast once the result of the smart contract $SC_{vote}$ 110 is appended to the blockchain. At step 810, the voter client 102 receives from the blockchain network 108 a confirmation of the vote along with the transaction hash reference. The transaction hash may be used to verify that the cast vote is stored permanently over the blockchain.

Figure 9:
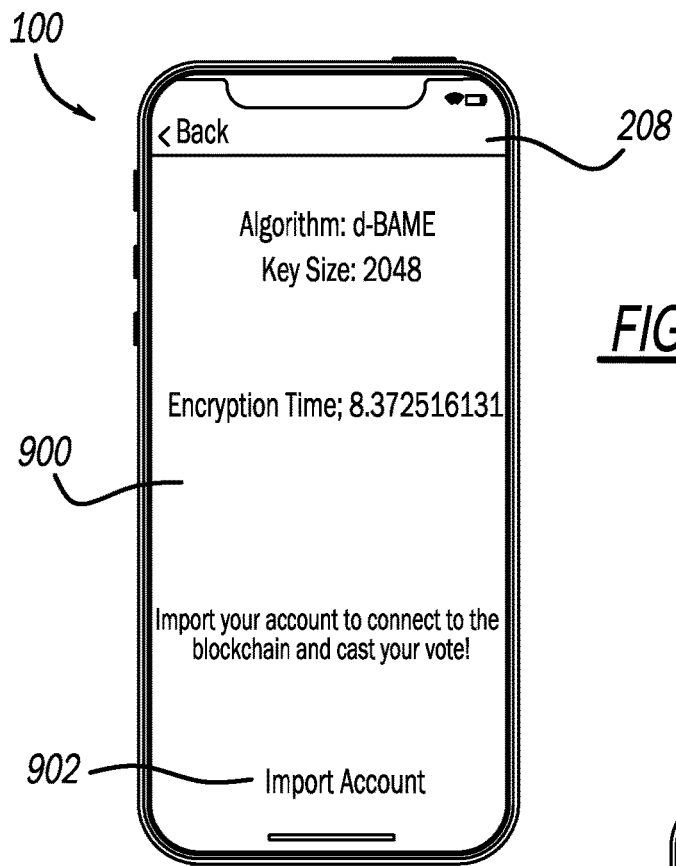
FIG. 9 is an image of an example graphical user interface of a software application on the voter client.

FIG. 9 shows another example graphical user interface of the software application on the voter client 102 showing an encryption result screen 900. The encryption result screen 900 may show the algorithm being used, the encryption key size, and the time it took to double encrypt the ballot at step 802 of FIG. 8. The encryption result screen 900 may also include a user interface element, such as control element 902 labeled, for example, "Import Account." The control element 902 may be a button that, when manipulated, may provide access to another graphical user interface as shown in FIG. 10.

Figure 10:
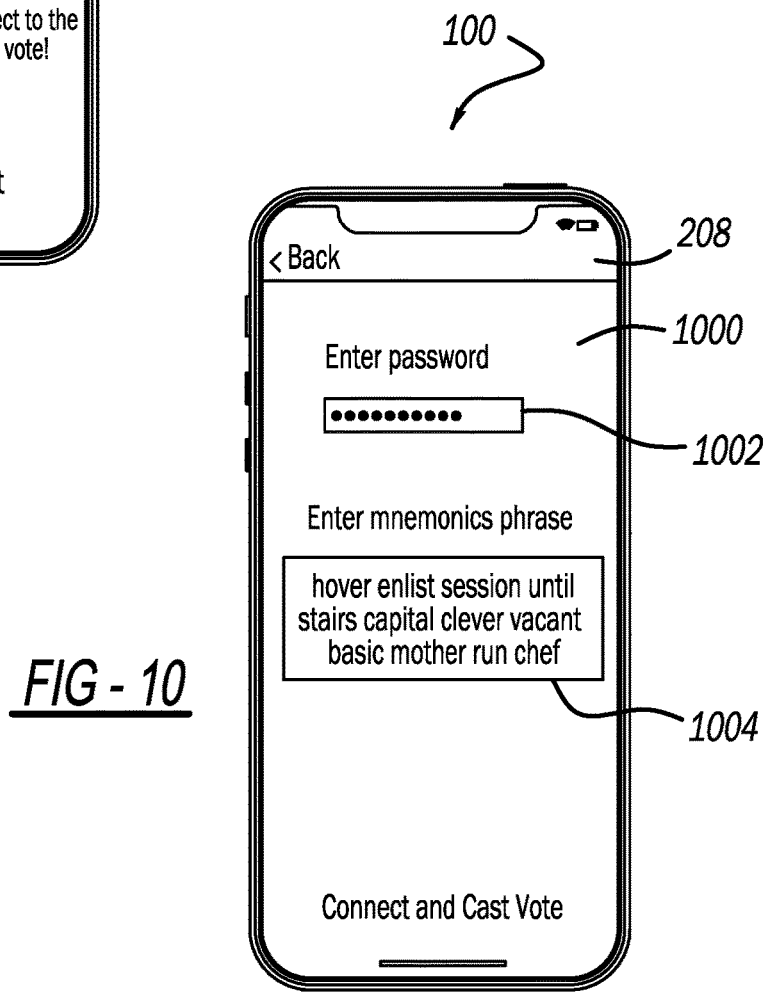
FIG. 10 is an image of an example graphical user interface of a software application on the voter client.

Now with reference to FIG. 10, another example graphical user interface of the software application on the voter client 102 shows an import account screen 1000. The import account screen 1000 may be accessed after the control element 902 is manipulated. The import account screen 1000 may include user interface elements, such as a text input box 1002 into which the voter 116 may enter their password and a text input box 1004 into which the voter 116 may enter a mnemonics phrase. The import account screen 1000 may further include a user interface element, such as control element 1006 labeled, for example, "Connect and Cast Vote." The control element 1006 may be a button that, when manipulated, causes the voter client 102 to perform steps 806, 808, and 810 of FIG. 8.

Figure 11:
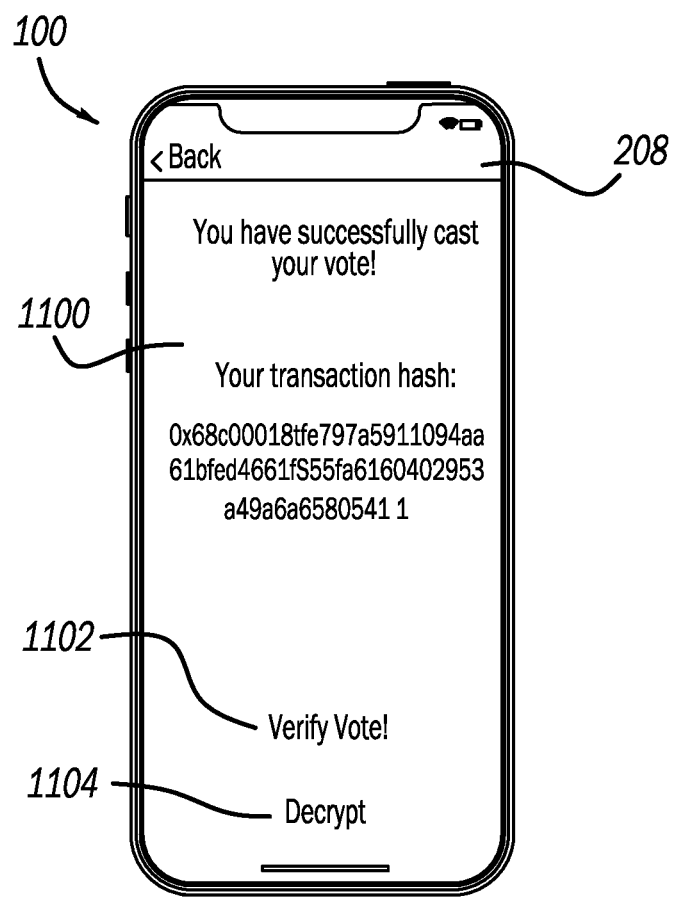
FIG. 11 is an image of an example graphical user interface of a software application on the voter client.
Figure 12:
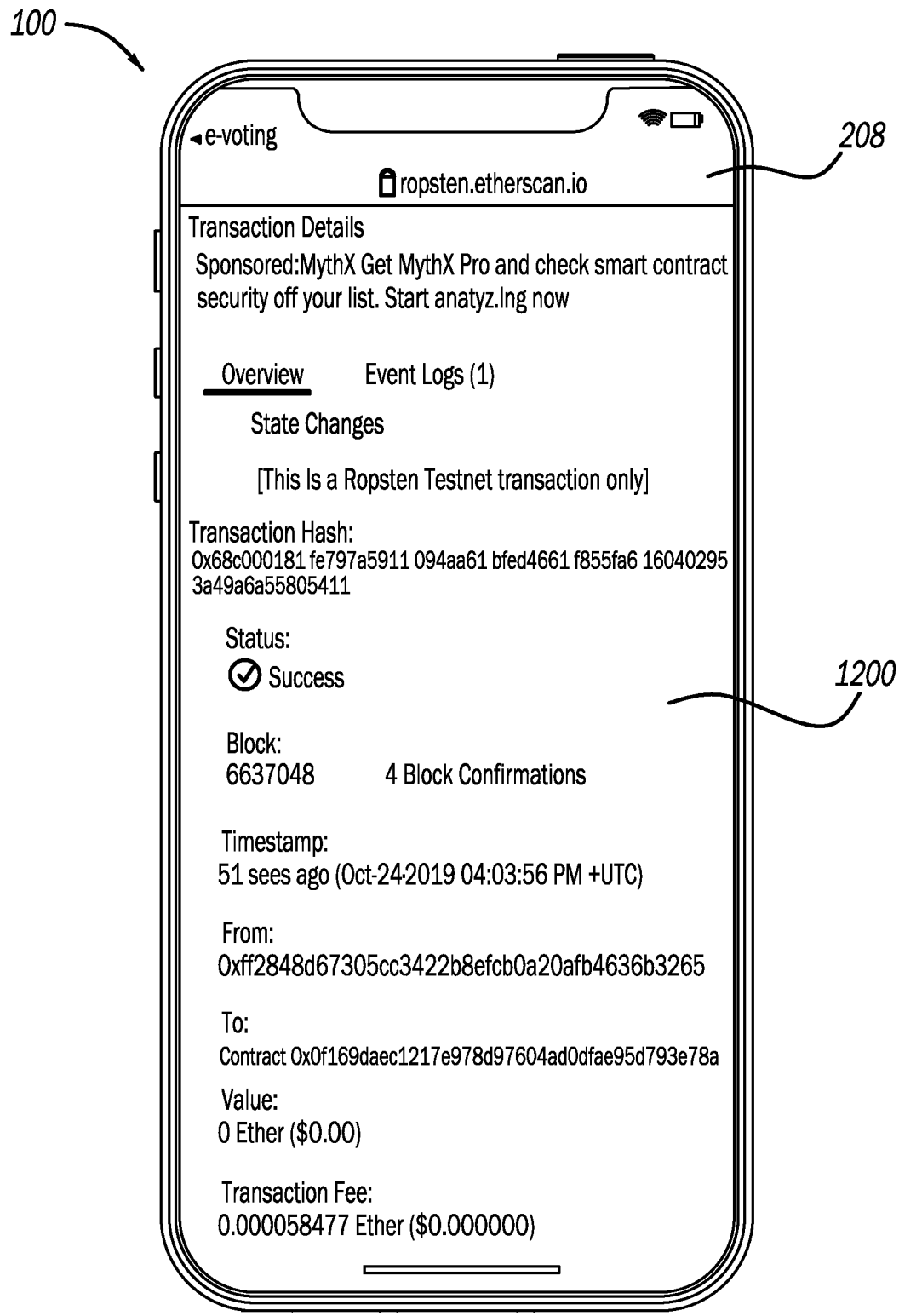
FIG. 12 is an image of an example graphical user interface of a software application on the voter client.

FIG. 11 shows another example graphical user interface of the software application on the voter client 102 showing a cast vote confirmation screen 1120. The cast vote confirmation screen 1120 may be displayed on the voter client 102 after steps 806, 808, and 810 of FIG. 8 are successfully completed. The cast vote confirmation screen 1120 may indicate that the voter 116 has successfully cast their vote and may display the transaction hash reference received from the blockchain at step 810 of FIG. 8. The cast vote confirmation screen 1120 may further include a user interface elements, such as control element 1122 labeled, for example, "Verify Vote!" and control element 1124 labeled, for example, "Decrypt." The control element 1122 may be a button that, when manipulated, may provide access to another graphical user interface as shown in FIG. 12. The control element 1124 may be a button that, when manipulated, may decrypt the voter's 116 cast ballot.

FIG. 12 shows yet another example graphical user interface of the software application on the voter client 102 showing a vote verification screen 1200. The vote verification screen 1200 may provide various transaction details regarding the cast vote, such as, for example, the transaction hash, the status, the block number, the timestamp, the voter identification hash, and the smart contract identification hash.

Figure 13:
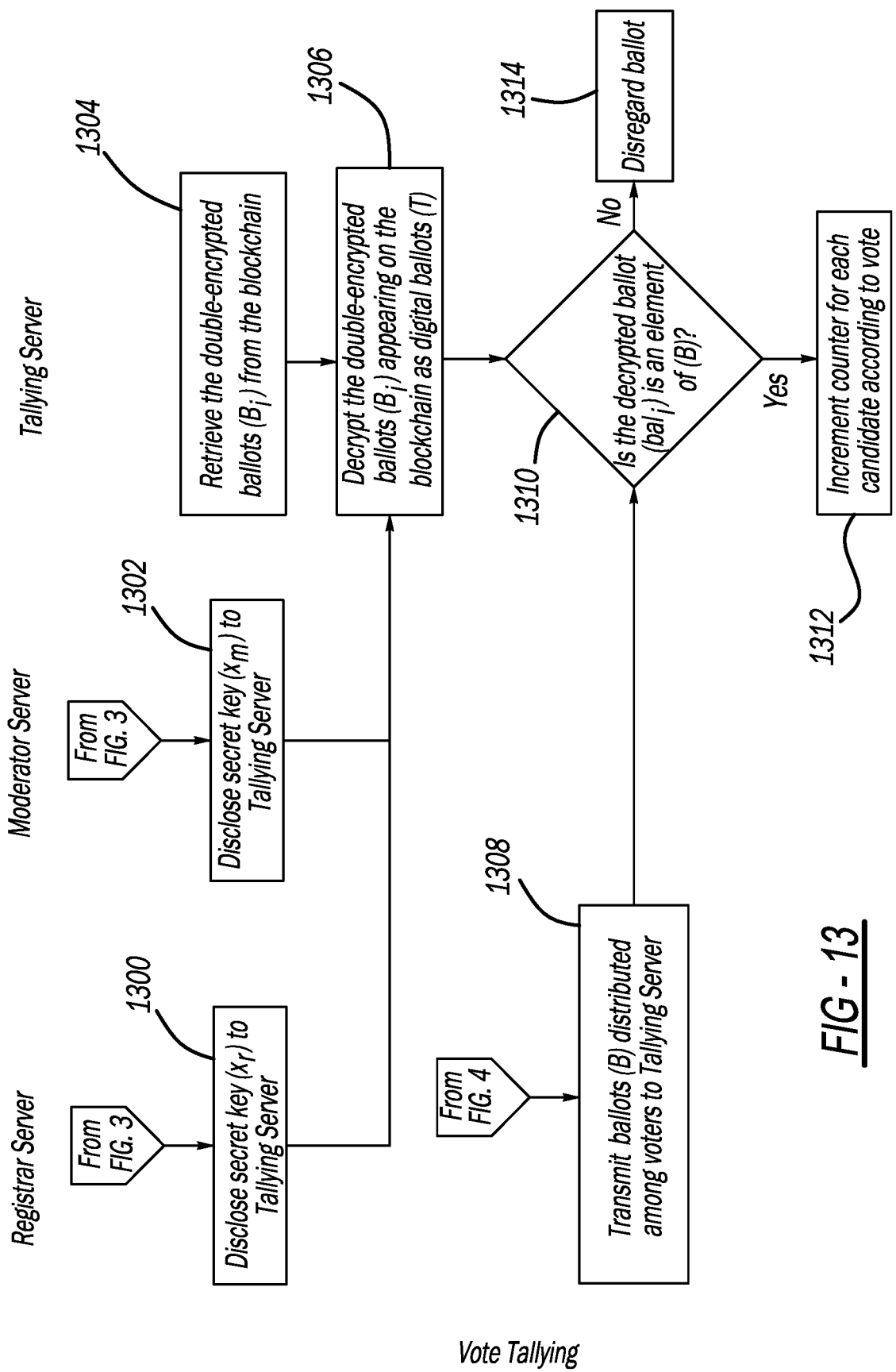
FIG. 13 is a flowchart illustrating an embodiment of a vote tabulation phase conducted by the system of FIG. 1.

Now with reference to FIG. 13, a flowchart of an embodiment of a vote tabulation phase conducted by the system 100 is shown. Votes that appear on the blockchain within the voting phase are collected to be validated and counted. At step 1300, the registrar server 104 publicly discloses its secret key ($x_r$) (selected at step 300 of FIG. 3) by transmitting it to the tallying server 112. The registrar secret key ($x_r$) may be transmitted from the registrar server 104 to the tallying server 112 via the network 114. At step 1302, the moderator server 106 publicly discloses its secret key ($x_m$) (selected at step 302 of FIG. 3) by transmitting it to the tallying server 112. The moderator secret key ($x_m$) may be transmitted from the moderator server 106 to the tallying server 112 via the network 114. At step 1304, the tallying server 112 retrieves from the blockchain network 108 all of the double-encrypted ballots ($B_i$) that were cast to the election vote smart contract $SC_{vote}$ 110 on the blockchain. At step 1306, after receiving the registrar secret key ($x_r$) and the moderator secret key ($x_m$), the tallying server 112 decrypts the double-encrypted ballots ($B_i$) appearing on the blockchain as:

$$T=c_4\cdot c_3^{-x_m}\cdot c_3^{-x_r}=T\cdot(y_r\cdot y_m)^v\cdot(g^v)^{-x_m}\cdot(g^v)^{-x_r}. \quad (16)$$

The decryption of the double-encrypted ballots ($B_i$) at step 1306 results in the tallying server obtaining the set of digitally-signed ballots ($\mathcal{B}$) containing the individual ballots ($bal_i$). At step 1308, the registrar server 104 transmits to the tallying server 112 the set of digitally-signed ballots ($\mathcal{B}$) distributed among all the voters 116 during the ballot acquisition phase (from step 404 in FIG. 4). At step 1310, the tallying server 112 determines whether a decrypted ballot (bal$_i$) is an element of the set of digitally-signed ballots ($\mathcal{B}$). If a decrypted ballot (bal$_i$) is an element of the set of digitally-signed ballots ($\mathcal{B}$), then at step 1312, the tallying server 112 examines the attached vote sequence in the decrypted ballot (bal$_i$) and increments the counter for each candidate accordingly. If however, a decrypted ballot (bal$_i$) is not an element of the set of digitally-signed ballots ($\mathcal{B}$), then at step 1314, the tallying server 112 disregards the decrypted ballot (bal$_i$). They tallying server 112 may repeat step 1310 and step 1312 or step 1314 for each decrypted ballot (bal$_i$) in the set of digitally-signed ballots ($\mathcal{B}$) until all decrypted ballots (bale) are analyzed. In some embodiments, the tallying server 112 may be programmed to disqualify votes that do not meet certain election rules. Each election may specify its own rules that disqualify votes which are cast incorrectly. For example, even if a decrypted ballot (bal$_i$) is an element of the set of digitally-signed ballots ($\mathcal{B}$), but contains a "Yes" vote for two opposing candidates, that vote may be disregarded and not counted.

The systems, apparatuses, and methods described herein may provide significant advantages. For example, the system 100 overcomes various security and privacy issues that can arise with electronic and remote voting. One such issue that the system 100 described herein can prevent is double-voting. Double-voting is the malicious act of attempting to cast more than one vote and it aims to give an election candidate an advantage in winning the election over others. In countries such as the United States, while the majority of states prohibit voting twice in the same election, only a few of them prohibit voting in more than one state. This means that eligible voters could register in more than one state and attempt to double-vote. The process of detecting and penalizing such voters becomes expensive and challenging. In remote electronic-voting systems, sometimes referred to as internet-voting (i-voting), voters receive digital ballots and cast their votes remotely rather than visiting a polling station. Because the system 100 uses the blockchain as a bulletin board to permanently store votes, it becomes simple to identify double-voting attempts that reuse digital ballots. However, the reuse of digital ballots is not the only method to attempt double-voting. Adversaries may attempt to double-vote by obtaining undeserved voting credentials giving them the right to cast more votes. An election running the system 100 described herein is secure against such attempts.

A voting scheme is said to be secure against double-voting if no PPT adversary is able to forge a digital ballot that is digitally signed by the registrar. It is theorized that it is infeasible for any adversary to generate a legitimate ballot that can be used to cast a vote correctly if the DDH assumption holds. In the system 100, each ballot bal$_i \in \mathcal{T}$ is digitally signed by the registrar server 104 before being distributed among the anonymous voters 116. For the adversary to generate acceptable ballots, it must be able to forge a signature of a ballot bal$_i$'=EG-Sign(t$_i$'). This requires the adversary to learn the secret key x$_r$ of the registrar server 104 or find collisions such that h(bal$_i$')=h(bal$_i$). Both operations can be reduced to the discrete logarithm problem. Therefore, it is infeasible for the adversary to generate a signed ballot correctly.

The system 100 can also provide voter anonymity. To preserve the anonymity of voters, an adversary should not be able to link any vote to a specific voter. The system 100 relies on a secure multi-party computation performed by parties of different allegiances to address this issue. As described herein, the system 100 utilizes a minimum of two conflicting parties to participate during the ballot distribution process, for example the moderator ($\mathcal{M}$) (and the moderator server 106) and the registrar ($\mathcal{R}$) (and the registrar server 104). As described, the moderator server 106 conceals the public key y$_i$ of the voter 116 using a blind factor b$_i$ and associates it with a random value selected from the permutation σ(i). On the other hand, the registrar server 104 selects a ballot randomly and assigns it to the anonymous voter 116. The moderator ($\mathcal{M}$) and the registrar ($\mathcal{R}$) would need to collude for ballots to be linked to the identities of voters 116. It is assumed that collusion is not in the best interest of any of these parties, therefore, voter anonymity can be preserved. The system 100 is considered to be secure under this assumption if (i) the probability of the registrar server 104 to identify a public key y$_i$ that has been randomly selected from a two-element public key chosen by the adversary and blinded does not significantly exceed ½ and (ii) the moderator server 106 cannot derive an encrypted ballot. Given these stringent conditions, any other adversary should not be able to break voter anonymity since it is assumed that access to voter identities and/or ballots is inadequate in comparison to both the registrar server 104 and moderator server 106.

First, using the Indistinguishability under Chosen-Plaintext Attack (IND-CPA) Security Game, it is proven that the registrar server 104 cannot derive a blinded public key. The DDH oracle is denoted as $\mathcal{O}_1$=(BFGen, Blind, Rec), where BFGen is the blind factor generation function, Blind is the blind function, and Rec is the recovery function. The IND-CPA game consists of a set of interactions between two PPT machines, an adversary $\mathcal{A}$ and a challenger C acting as the moderator. At a first step, $\mathcal{C}$ computes a blind factor f=BFGen(1$^k$) and keeps it secret. At a second step, since $\mathcal{A}$ does not have access to $\mathcal{O}_1$, it may request that $\mathcal{C}$ blinds for it as many public addresses as it likes during any time of the game. A then computes two public addresses y$_0$ and y$_1$ to be challenged against and sends them to $\mathcal{C}$. At a third step, $\mathcal{C}$ uniformly and randomly selects µε$_r${0,1} then computes y'=Blind(f,s,y$_\mu$), where s represents a randomness state to diversify the blind process and is a value that has not been used in any of the previously computed ciphertexts. Next, $\mathcal{C}$ sends y' to $\mathcal{A}$. At a fourth step, $\mathcal{A}$ outputs a guess µ' of µ·$\mathcal{A}$ wins the security game if µ'=µ and loses otherwise. An adversary that can derive which public key was blinded in polynomial time may be able to identify the identities of the voters 116 and link them to the ballots being assigned. The DDH assumption implies that the adversary is unable to get a non-negligible advantage from the IND-CPA Security Game in determining the public key that is blinded.

Second, it is proven that the moderator server 106 cannot derive the actual ballot from the encrypted ballot by the registrar server 104. A voting scheme is said to preserve the anonymity of voters if no PPT adversary is able to get a non-negligible advantage in deriving the identity of the voter of any cast ballot. It is theorized that the system 100 preserves the voter anonymity if the DDH assumption holds. First, it is proven that the registrar server 104 cannot derive the identity of a voter 116 to whom it has assigned a ballot. Assume there is an adversary that has non-negligible advantage ε, then $$\text{Adv}_{\mathcal{A}} > \frac{1}{2} + \varepsilon.$$

A simulator $\mathcal{A}$ is constructed that can distinguish a DDH element from a random element with advantage ε. Let $\mathbb{G}$ be a publicly chosen multiplicative cyclic group of prime order p. The DDH challenger begins by selecting the random parameters: a, b$\in_r \mathbb{Z}_p^*$. Let g$\in \mathbb{G}$ be a generator and Y is defined as Y=$g^{ab}$(mod p) if $\mu$=0, and Y=$g^c$ (mod p) for some random c$\in \mathbb{Z}_p^*$ otherwise, where $\mu \in_r \{0,1\}$. The simulator acts as the challenger in the IND-CPA game. At a first step, $C$ chooses a blind factor f$\in_r \mathbb{Z}_p^*$ and state s*$\in_r \mathbb{Z}_p^*$ then computes s=s*+ab and keeps them secret. At a second step, $\mathcal{A}$ chooses two secret keys $x_0, x_1 \in_r \mathbb{Z}_p^*$ then computes their corresponding public addresses $y_0$ and $y_i$ and sends them to $C$. At a third step, $C$ uniformly and randomly selects $\mu \in_r \{0,1\}$ then computes y*=Blind(f,s,$y_\mu$)=$y_\mu^f g^s$=$g^{x_\mu f}$ $g^{s*+ab}$=$g^{x_\mu f} g^{s*}$Y(mod p), where Y=$g^{ab}$(mod p). Next, $C$ sends y* to $\mathcal{A}$. At a fourth step, $\mathcal{A}$ outputs a guess $\mu'$ of $\mu$. $\mathcal{A}$ wins the security game if $\mu'$=$\mu$ and loses otherwise.

Given $\mathcal{A}$, if Y=$g^{ab}$(mod p), then y* is a valid ciphertext, Adv=$\varepsilon$ and $$Pr[\mathcal{A}(g, g^a, g^b, Y = g^{ab}) = 1] = \frac{1}{2} + \varepsilon. \quad (17)$$

If Y=$g^c$ (mod p) or Y$\neq g^{ab}$(mod p) then y* is nothing more than a random value to the adversary. Therefore, $$Pr[\mathcal{A}(g, g^a, g^b, Y = g^c) = 1] = \frac{1}{2}. \quad (18)$$

From equation (17) and equation (18), it is concluded that $|Pr[\mathcal{A} (g,g^a,g^b,Y=g^{ab})=1]-Pr[\mathcal{A} (g,g^a,g^b,Y=g^c)=1]|=\varepsilon$. The simulator plays the DDH game with a non-negligible advantage which contradicts the DDH assumption. Therefore, neither the registrar server 104 nor any other adversary can get any advantage $\varepsilon$ to derive the identity of a voter 116 that has been assigned a known ballot.

Concurrently, the moderator server 106 has no advantage in deriving the assigned ballot it transmits to the voter 116 during the ballot transmission process. Each bal$_i$ is encrypted by the registrar server 104 as shown in equation (8) prior to being shared with the moderator server 106. The encryption key $k_i$ is generated by the registrar server 104 based on the blinded public key $y_i'$ and a value $q_i \in \mathbb{Z}_p^*$ selected randomly. This derivation can be reduced to the discrete logarithm problem making it infeasible for the moderator server 106 or any other adversary to derive the encryption key $k_i$ and decrypt the encrypted ballot ebal$_i$. Therefore, the system 100 preserves voter 116 anonymity against the registrar server 104, the moderator server 106, and any other adversary, and the proof is complete.

The system 100 can also provide coercion-resistance and ballot unlinkability. In the system 100, casting a vote traces back to the voters 116 encrypting their desired votes as shown in equation (14). To prove that the proposed scheme is coercion-resistant, the IND-CPA game is used consisting of a DDH oracle $\mathcal{O}_2$=(KeyGen,D-Enc,D-Dec), where Key-Gen is a public key pair generator, D-Enc and D-Dec are the encryption and decryption functions shown in equations (14) and (16) respectively. The IND-CPA game is a set of interactions between two PPT machines, an adversary $\mathcal{A}$ and a challenger $C$. At a first step, $C$ computes two pairs of keys KeyGen($1^k$)$\rightarrow$($y_0,x_0$) and KeyGen($1^k$)$\rightarrow$($y_1,x_1$) then sends the public keys $y_0$ and $y_1$ to $\mathcal{A}$ while keeping $x_0$ and $x_1$ secret. At a second step, $\mathcal{A}$ has access to $\mathcal{O}_2$ and can encrypt as many T=(bal$\|$Vote) of its choice. Next, $\mathcal{A}$ chooses a $T_0$=(bal$\|$Vote$_0$) and $T_1$=(bal$\|$Vote$_1$) then sends them to $C$. At a third step, $C$ uniformly and randomly selects $\mu \in_r \{0, 1\}$ then computes c*=D-Enc($g^v$, $T_\mu \cdot (y_r \cdot y_m)^v$). Next, $C$ sends c* to $\mathcal{A}$. At a fourth step, $\mathcal{A}$ outputs a guess $\mu'$ of $\mu$. $\mathcal{A}$ wins the security game if $\mu'$=$\mu$ and loses otherwise. An adversary that can derive which T was encrypted efficiently may potentially be able to learn if voters 116 have resubmitted their votes under the same ballots. In some embodiments of the system 100, only the last cast vote with a legitimate ballot is counted towards the election. As a result, the adversary may be able to discover whether the coerced voter has behaved as instructed. The DDH assumption implies that the adversary is unable to get a non-negligible advantage from the IND-CPA Security Game in determining the T that was encrypted.

A voting scheme is said to be coercion-resistant if no PPT adversary is able to get a non-negligible advantage by performing the IND-CPA Security Game, i.e.

$$\text{Adv}_{\mathcal{A}} = Pr[\mu' = \mu_i] < \frac{1}{2} + \varepsilon.$$

for any negligible $\varepsilon$. It is theorized that the system 100 is coercion-resistant if the DDH assumption holds. In order to prove that the system 100 is coercion-resistant, it is assumed there is an adversary that has non-negligible advantage $\varepsilon$, i.e., $$\text{Adv}_{\mathcal{A}} > \frac{1}{2} + \varepsilon.$$

H simulator $\mathcal{A}$ is constructed that can distinguish a DDH element from a random element with $\varepsilon$. Let $\mathbb{G}$ be a publicly chosen multiplicative cyclic group of prime order p. The DDH challenger begins by selecting the random parameters: a,b$\in_r \mathbb{Z}_p^*$. Let g$\in \mathbb{G}$ be a generator and Y is defined as Y=$g^{2ab}$(mod p) if $\mu$=0, and Y=$g^c$ (mod p) for some random c$\in \mathbb{Z}_p^*$ otherwise, where $\mu \in_r \{0,1\}$. The simulator acts as the challenger in the following game. At a first step, $C$ chooses the parameters $x_0^*, x_1^* \in_r \mathbb{Z}_p^*$ then computes $x_0$=$x_0^*$+a and $x_1$=$x_1^*$+a. Next, it simulates $y_0$=$g^{x_0}\leftarrow g^{x_0^*+a}$(mod p) and $y_1$=$g^{x_1}\leftarrow g^{x_1^*+a}$(mod p). Finally, it sends $y_0$ and $y_i$ to $\mathcal{A}$ and keeps $x_0$ and $x_1$ secret. At a second step, $\mathcal{A}$ chooses a $T_0$=(bal$\|$Vote$_0$) and $T_1$=(bal$\|$Vote$_1$) then sends them to the simulator. At a third step, $C$ uniformly and randomly selects $\mu \in_r \{0, 1\}$ then computes c*=D-Enc$_{y_0, y_1}(T_\mu)$=($g^b, T_\mu \cdot$ ($g^{(x_0^*+a)b} \cdot g^{(x_1^*+a)b}$))=($g^b, T_\mu \cdot (g^{x_0^*} \cdot g^{x_1^*} \cdot g^{2ab})$)=($g^b$ $T_\mu \cdot$ ($g^{(x_0^*+a)b \cdot (x_1^*+a)b}$))=($g^b T_\mu \cdot Y \cdot (g^{x_0^*} \cdot g^{x_1^*})$), where Y=$g^{2ab}$ (mod p). Next, $C$ sends c* to $\mathcal{A}$. At a fourth step, if $\mathcal{A}$ guesses the correct value, the challenger outputs 0 to indicate that Y=$g^{2ab}$, or 1 to indicate that Y=R, a random group element in $\mathbb{G}$. Given $\mathcal{A}$, if Y=$g^{2ab}$(mod p), then c* is a valid ciphertext, Adv=$\varepsilon$ and $$Pr[\mathcal{A}(g, g^a, g^b, Y = g^{2ab}) = 1] = \frac{1}{2} + \varepsilon. \quad (19)$$

Y=$g^c$ (mod p) or Y$\neq g^{2ab}$(mod p) then y* then c* is nothing more than a random value to the adversary. Therefore, $$Pr[\mathcal{A}(g, g^a, g^b, Y = g^c) = 1] = \frac{1}{2}. \quad (20)$$

From equation (19) and equation (20), it is concluded that $$|\Pr[\mathcal{A}/(g,g^a,g^b,Y=g^{2ab})=1]-\Pr[\mathcal{A}(g,g^a,g^b,Y=g^c)=1]|=\varepsilon$$

The simulator plays the DDH game with a non-negligible advantage which contradicts the DDH assumption. Therefore the adversary cannot have advantage ε and the proof is complete.

It is further theorized that it is computationally infeasible to link any ballot to the voter 116, or link multiple votes cast by one voter 116 (including the ones created for coercion). As described above, the system 100 preserves voter anonymity. Correspondingly, it is computationally infeasible for an adversary to link a ballot to the voter 116. It is also shown that the system 100 is coercion-resistant during the casting votes phase. In some embodiments, the system 100 may allow voters 116 to cast their votes multiple times in an election having only the predetermined vote counted toward the election results. By design and to provide voter verifiability once the election results are disclosed, the coercer may learn that the voter 116 has not voted as instructed.

The system 100 may also provide security against election results manipulation. The system 100 utilizes a blockchain as its public bulletin board for voters 116 to cast their votes. Voters 116 interact with the vote smart contract 110 that accepts a vote in the form shown by equation (14) as input. At the end of the voting phase, the tallying server 112 scans the blockchain logs to collect all votes that have been cast during the voting phase. Votes that pass the validation are counted towards the election results while those that fail are discarded. Valid votes are posted to the blockchain along with their corresponding ballots to announce election results and allow voter validation. Voters 116 are able to individually recognize that their votes have been counted correctly towards the final election results.

Before casting their votes to the blockchain, voters 116 are required to double encrypt their votes under the public keys $y_r$ and $y_m$ of the registrar server 104 and moderator server 106. The encryption conceals the actual vote during the voting phase and protects the integrity of the results from last-minute voters 116 that may try to manipulate the election results in a close race by voting in favor of a certain candidate or party. However, encryption alone may be insufficient to prevent an adversary from attempting to manipulate the election results. An adversary with significant computational power may attempt to remove votes that have already been cast from the blockchain to reduce the count of a candidate or party. To do this, the adversary must compete in the blockchain mining process to fork the blockchain and remove certain blocks carrying specific votes.

It is also theorized that the system 100 is secure against election result manipulation if the computational power of the adversary in the blockchain network is $q<\frac{1}{2}<p$ where p is the computational power of the honest miners. This theory is proven by first modeling the race of generating a block as a binomial random walk. Let z be the number of blocks generated by the honest miners minus the number of blocks generated by the adversary. This race can be derived as:

$$z_{i+1} = \begin{cases} z_i + 1, \text{ with probability } p, \\ z_i - 1, \text{ with probability } q. \end{cases} \quad (21)$$

Then, using the negative binomial distribution, the probability of success of the adversary can be modeled. First, the probability of the attacker to surpass the blocks generated by the honest miners as:

$$Q_z = \left(\frac{q}{p}\right)^{z+1}, \quad (22)$$

where $z \geq 0$. It is then assumed a voter 116 waits for n new blocks to be generated by the honest miners to be appended to the blockchain beyond the block containing their vote. It is also assumed that, at that time, the adversary is able to secretly generate m=n+1 blocks. This can be modeled as m blocks that the adversary can generate before n blocks are generated by the honest miners. Therefore, the probability of reversing a transaction for a given value m is:

$$Pr(m) = \binom{m+n-1}{m} \times p^n q^m. \quad (23)$$

The probability for the adversary to surpass successfully the number of blocks generated by the honest miners can be computed as:

$$\begin{aligned} Pr_s &= \sum_{m=0}^{n-1} Pr(m) \times Q_{n-m-1} \\ &= 1 - \sum_{m=0}^{n-1} \binom{m+n-1}{m} \times p^n q^m \times \left(1 - \left(\frac{q}{p}\right)^{n-m}\right) \\ &= 1 - \sum_{m=0}^{n-1} \binom{m+n-1}{m} \times (p^n q^m - p^m q^n) \end{aligned} \quad (24)$$

For attackers to succeed in performing the attack, they must be able to generate more blocks, i.e. m>n. The likelihood decreases as n and/or p increase since q<p and the attackers are limited to the election time frame. Therefore, as more blocks are appended to the blockchain, manipulation of the election result becomes less likely or even infeasible.

The system 100 may also provide performance benefits. The computational costs of each voting stage are formulated based on the number of multiplication (M) and exponentiation (E) operations. During the setup phase, the moderator server 106 and the registrar server 104 generate their public key pairs, $y_m$ and $y_r$, that are used during the entire election process, imposing a single E operation for each. During the voter registration phase, the system 100 includes the registrar server 104 to facilitate voter registration. Voters 116 begin by generating their key pairs $(x_i, y_i)$. After verifying the eligibility of voters 116, the registrar server 104 signs the voter 116 public keys and adds them to the electoral roll. The total signatures for registering all voters 116 are 2 nM and 2nE operations. During the ballot acquisition phase, the system 100 involves voter client 102 engagement with the moderator server 106 and the registrar server 104. Initially, the registrar server 104 generates the set of random and digitally signed ballots. Next, the voter client 102 interacts with the moderator server 106, which obscures the identities of the voters 116 from the registrar server 104 while facilitating ballot distribution. The total operations performed by the voter client 102, the moderator server 106, and the registrar server 104 are 2M+2E, 2 nM+6nE, and 2nE operations, respectively. During the vote casting phase, the voter client 102 double encrypts the ballot $bal_i$ using the public keys $y_r$ and $y_m$ of both the registrar server 104 and the moderator server 106 and attach it to the $Vote_i$ where, $Vote_i$ is a sequence of bits representing each candidate, 1 if voting for $cand_k$ and 0 if not voting for $cand_k$. The total operations performed by the voter client 102 include 2M and 2E operations. During the tabulation phase, the tallying server 112 double decrypts each existing vote using the revealed moderator server 106 and registrar server 104 private keys, $x_m$ and $x_r$. Tabulation includes 2 nM and 2nE operations. Overall, the system 100 has less computational costs than other electronic election systems with comparable design goals.

The system 100 also provides increased scalability. The current design of the Ethereum blockchain is limited to being able to process 15 transactions per second. This requires significant time to handle large-scale elections in the order of millions of votes. For example, approximately 138 million Americans voted in the 2016 U.S. presidential elections. Running an election of that size utilizing the system 100 over the Ethereum blockchain would require at least 107 days to complete the casting votes phase. However, multiple scalable blockchains have been proposed to handle this scalability issue. For example, permissioned blockchains such as Hyperledger Fabric have been proposed with predefined and regulated mining nodes. Research has shown that the Hyperledger Fabric blockchain can process up to 20,000 transactions per second. While an election of the same size of the 2016 U.S. presidential election can be processed in approximately 0.08 days over such optimized versions, this blockchain may compromise the security and privacy of the cast votes due to its permissioned nature. More recently, the permissionless Trifecta blockchain has been proposed that handles the blockchain trilemma of decentralization, security, and scalability. The Trifecta blockchain uses a PoW governance mechanism similar to that of the Ethereum blockchain and can process up to 250,000 transactions per second. With this solution, decentralization and security is maintained while processing the 2016 presidential election in approximately 552 seconds. Thus, in some embodiments, the blockchain network 108 of the system 100 may be the Trifecta blockchain.

Through two simulations of the system 100, the following empirical results were obtained. In the first simulation, the voter client 102 was implemented using a desktop computer. In the second simulation, the voter client 102 was implemented using a smartphone. In both simulations, the voter client 102 included instructions 206 to carry out at least some of the voter client 102 steps described herein.

In the simulations, the voter client 102 interacted with a Solidity-based smart contract deployed over the Ethereum Ropsten testnet blockchain to cast the encrypted votes at the end of the voting stage. The main inputs to the smart contract were the two encrypted vote components, $B_i=(c_3,c_4)$, as depicted in equation (14).

For an election, the voter client 102 may be a desktop or mobile device. After vote casting is complete, tabulating the votes is a job performed by the tallying server 112. The tallying server 112 may include one or more powerful computers which may perform the tabulation offline. It was assumed that, in some embodiments, all stages are performed over a mobile device while tabulation is performed by anyone that has access to a desktop machine. The system 100 is the only electronic election system that allows voters 116 to generate the election results themselves if they wish and can afford the required computational requirements.

Figure 14:
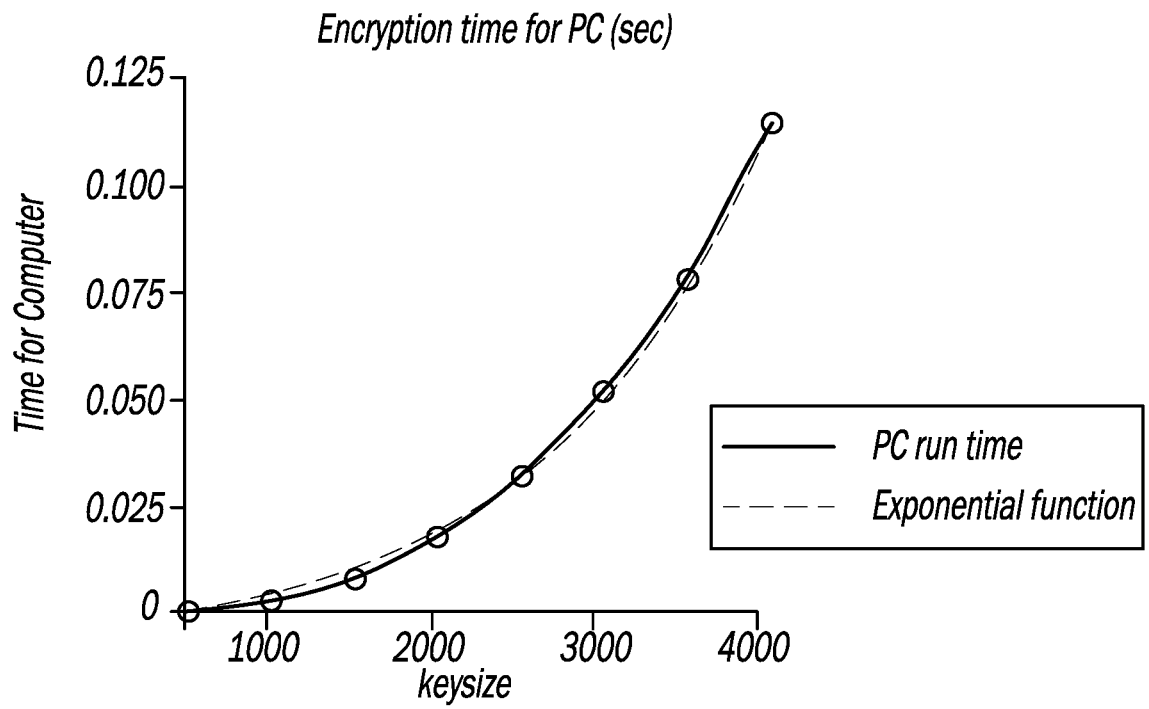
FIG. 14 is a chart illustrating the time costs against encryption key sizes for a simulation of an embodiment of the voter client wherein the voter client is a desktop computer.
Figure 15:
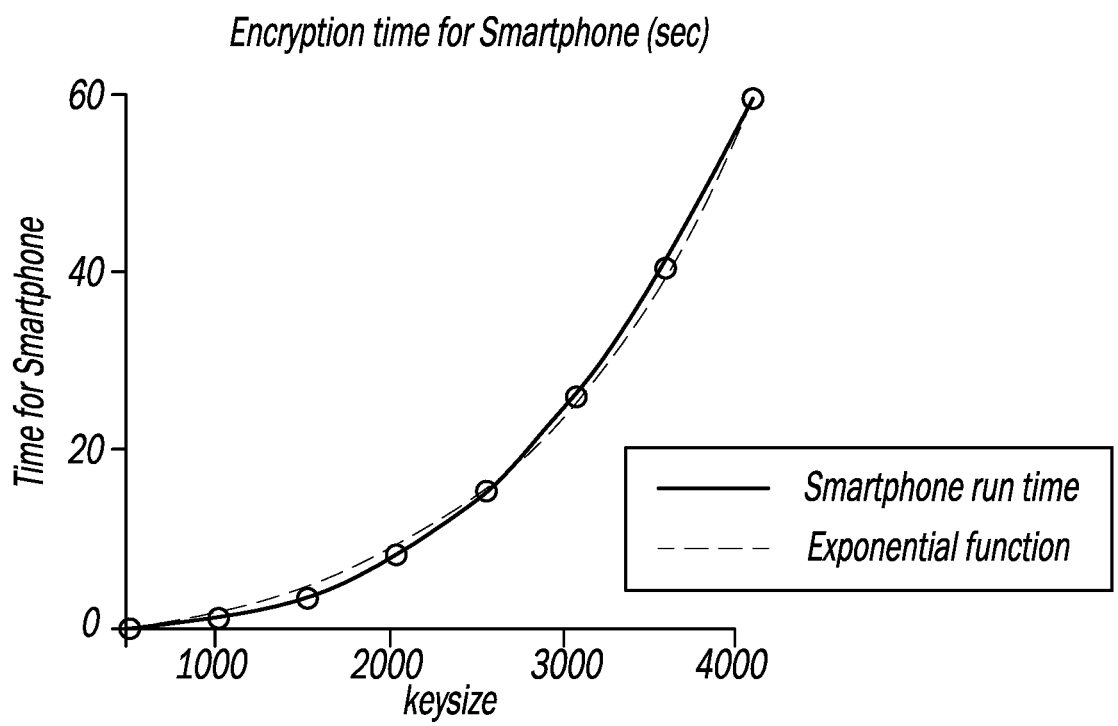
FIG. 15 is a chart illustrating the time costs against encryption key sizes for a simulation of an embodiment of the voter client wherein the voter client is a smartphone.
Figure 16:
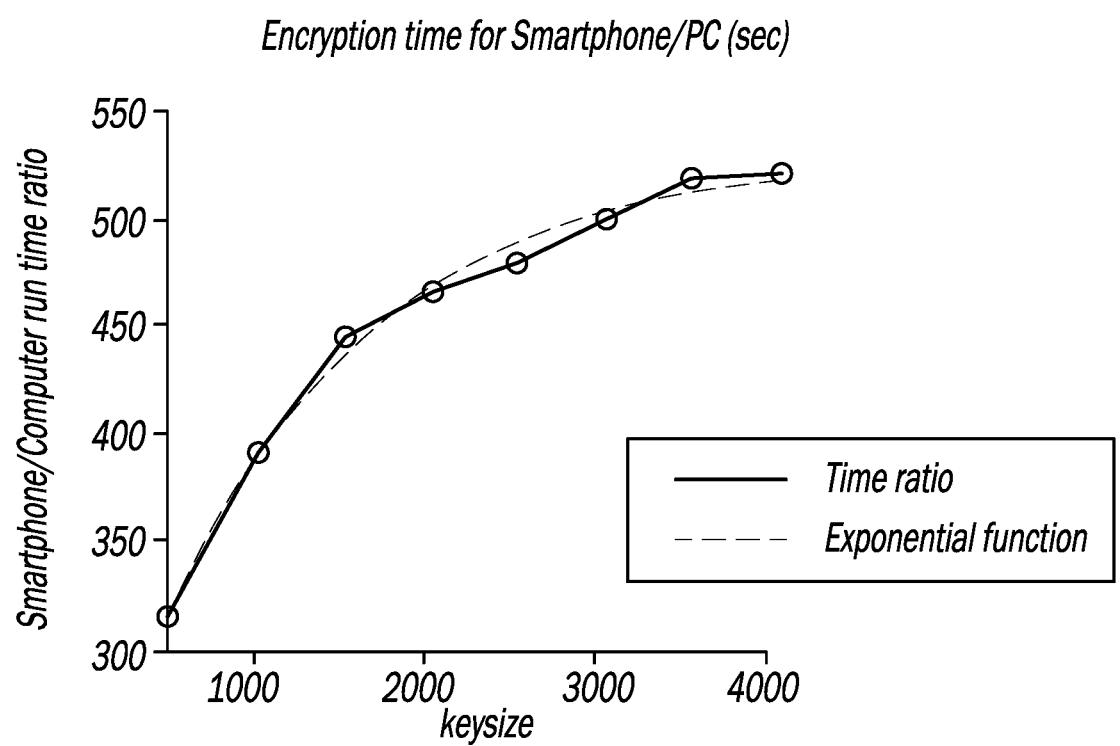
FIG. 16 is a chart illustrating the ratio of time costs against encryption key sizes comparing the simulation of an embodiment of the voter client wherein the voter client is a desktop computer to the simulation of an embodiment of the voter client wherein the voter client is a smartphone.

The simulations allowed investigation of the different time costs to perform the double encryption computation presented in equation (14) for both a desktop computer and a smartphone. FIGS. 14, 15, and 16 show the simulated time costs obtained under eight different encryption key sizes. The presented time costs are the average time costs of ten different trials for each key size. FIG. 14 shows that with maximized security at a key size of 4096 bits, voters 116 can cast their votes in approximately 0.11 seconds using a desktop as the voter client 102. Correspondingly, FIG. 15 shows that to maintain the same level of security while using a smartphone as the voter client 102, it would take less than a minute to cast a vote. In both cases, the time increases exponentially with increasing of key sizes. Today, in practice, key sizes of 2048 bits are generally considered secure, hence, casting a vote through a mobile device can be reduced to approximately 8.36 seconds. The difference between the time costs and of a desktop voter client 102 and a smartphone voter client 102 is evident because of the processor capabilities. Desktop machines are generally built with more powerful processors giving them a conspicuous advantage over smartphones. However, the purpose of this analysis is to prove that even with this advantage, it is still feasible to use a smartphone voter client 102 and achieve acceptable results.

To further analyze our findings, the smartphone to desktop time cost ratio was measured and its change with increasing the key size was observed. FIG. 16 presents these results showing that as the key size increases, the ratio increases logarithmically. This suggests that, beyond a certain key size, the advantage of using a desktop voter client 102 versus running a smartphone voter client 102 decays as the keys grow in size. For example, as shown in FIG. 16, the smartphone/desktop ratio at a key size of 2048 bits is 466 and increases to 478 with key size of 2560 bits, showing a 2.5% increase. This increase is smaller when compared to the ratio increase between key size of 1536 bits, where the ratio is 444, and that at key size of 2048 bits, showing an increase of 5%. This pattern can be observed between all key sizes shown in the figure.

In some embodiments, the implementation of the system 100 may be modified based on the type of election. For example, an election for a country's president may be conducted with a different implementation of the system 100 than an election for a school board. In traditional paper ballot-based voting systems, voters cast their votes in a physically isolated environment without facing interference from coercers throughout the election process. However, universal verifiability is limited to monitoring ballots as they are counted which is prone to significant error. Even when utilizing on-site computerized voting machines to provide features such as voter and universal verifiability, voters must trust that these machines are secure, privacy-preserving, and software independent, which means that an undetected change or error in its software cannot cause an undetectable change or error in an election outcome.

On the contrary, in i-voting systems, voting is performed remotely by the voters via their personal devices such desktops or mobile devices, allow features such as voter and universal verifiability features to be more easily implemented. Assuming the devices are secure, voters need just to trust that the installed voting software is legitimate. However, with i-voting, it is possible that the coercers can interfere with any phase of the voting process. To address this concern, a stronger form of private voting known as coercion-resistance emerged. A coercion-resistant voting system is one that accounts for coercers that can engage with voters while they cast their votes remotely during an election. Engagement may be in the form of a coercers forcing voters to cast their votes in a specific form or even forcing them to divulge their voting credentials by easily blackmailing the voters. Other engagements may even include coercers willing to peacefully buy votes from the voters.

As described herein, with the system 100 two conflicting parties facilitate the anonymous distribution of uniquely generated ballots. It is not in any interest of either party to share any information during ballot distribution, thus, the identities of voters and their anonymously assigned ballots remain concealed. Consequently, voter verifiability is achieved since voters can recognize their ballots. While the uniqueness of the ballots ensures voter verifiability, it also gives rise to the coercion problem. Coercers that can get access to the ballots of voters will also be able to learn if these voters have behaved as instructed once the election results are finalized and disclosed, i.e. weak coercion-resistance. This results in a clear conflict between the universal verifiability and coercion-resistance features. The system 100 is designed to achieve a trade-off between these two characteristics, allowing an election to favor one over the other.

In some embodiments, if universal verifiability is desired, at the end of the tabulation phase, the registrar server 104 and the moderator server 106 both disclose their private keys ($x_r$) and ($x_m$) and the tallying server 112 publishes the results of the election on the blockchain, which allows all voters 116 to verify that their votes have been counted properly toward the election. In some embodiments, votes can be published along with their corresponding ballots over the blockchain as proof of the legitimacy of the election results. Any individual can validate that all votes have been cast and counted properly. Publishing the votes with their corresponding ballots prevents the registrar ($\mathcal{R}$) from attempting to issue unassigned ballots to voters 116 in favor of a particular candidate. However, universal verifiability provides reduced coercion-resistance. Once the election results are disclosed, the coercers would be able to find out whether the coerced votes are being counted toward the election.

In some embodiments, the system 100 provides strong coercion-resistance. A practical coercion-resistant voting system should be receipt-free, allowing voters 116 to evade proving to their coercers how they voted. In some embodiments, the system 100 does not generate any legitimate evidence that could leak information about the votes. For example, in some embodiments, the voter client 102 does not generate an encryption of the voter's 116 votes as shown in Equation (14). This can be viewed as a receipt and may allow information to be leaked on how voters have voted. Therefore, in some embodiments, if strong coercion-resistance is desired, ballot verification is delegated to the registrar server 104 and the moderator server 106. The registrar server 104 and the moderator server 106 then jointly decrypt and publish the results excluding the ballots. Given that the registrar ($\mathcal{R}$) and the moderator ($\mathcal{M}$) are unlikely to collude and that their verifications must match, voters 116 can trust that the election result integrity is maintained.

In some embodiments, the system 100 offers receipt-freeness. After a vote is cast as described in equation (14) (step 802 of FIG. 8), the moderator server 106 decrypts then re-encrypts the ballot as follows:

$$B_i'=(c_3 g^u, c_4 c_3^{-x} m y_u^r)=(g^{v+u}, Ty_r^{v+u})=(c_3',c_4'), \quad (25)$$

where $\mathbb{Z} \in u_p^*$. This conceals the ballots of voters 116 preventing the ballots from being identified during the vote casting phase. After tallying is performed and the election results are disclosed, voter and universal verifiability can still be performed since ballots are unconcealed.

In some embodiments, the system 100 counts the first ballot. In some embodiments, the system 100 counts the last ($n^{th}$) ballot. Voters 116 receive unique digital ballots which they use to cast their votes to the blockchain. This allows voters to cast their votes multiple times while the system 100 identifies those voters 116 trying to double vote. As a result, only one cast vote corresponding to each legitimate voter 116 is counted toward the final election results. Some elections favoring counting the first vote may be more prone to coercion. It becomes more difficult for coercers to monitor and detect how voters 116 have voted since they must be physically present in a timely manner among the voters to force them to give up their credentials. In large-scale elections, this becomes infeasible due to the geographical distribution of voters 116. Thus, the overall effect of coercing voters 116 to manipulate the election results becomes insignificant. On the other hand, other elections may favor counting the last ($n^{th}$) cast ballot. In some embodiments, the system 100 allows the voters 116 to change their minds and re-cast their votes.

While various embodiments have been disclosed herein, it should be appreciated that other variations may exist. Any and all of the previously disclosed features may be mixed and matched with any or all of the other embodiments. Moreover, all of the following claims can be multiply dependent on each other in any combination. The above description is merely exemplary in nature and, thus, variations that do not depart from the gist of the invention are intended to fall within the spirit and scope of the present invention.

The invention claimed is:

1. A control system for conducting an election, the control system comprising:
    (a) a voter client configured to be used by a voter to cast a vote for a candidate;
    (b) a registrar server; and
    (c) a moderator server;
    wherein:
        (i) the voter client is configured transmit a voter public key ($y_i$) to the moderator server;
        (ii) the moderator server is configured to verify the eligibility of the voter by comparing the voter public key ($y_i$) with an electoral roll, and in response to determining the voter is eligible to vote, the moderator server is configured to obscure the identity of the voter by computing an obscured voter public key ($y'_i$) using a blind factor ($b_i$);
        (iii) the moderator server is configured to generate a permuted set σ of n unique numbers;
        (iv) the moderator server is configured to transmit the obscured voter public key ($y'_i$) and a number σ(i) from the permuted set σ of n unique numbers to the registrar server;
        (v) the registrar server is configured to randomly assign a ballot ($bal_i$) from a set of digitally-signed ballots ($\mathcal{B}$) to the obscured voter;
        (vi) the registrar server is configured to encrypt the ballot using a ballot encryption key ($k_i$) to generate an encrypted ballot ($ebal_i$);
        (vii) the registrar server is configured to generate an ephemeral key ($Q_i$);
        (viii) the registrar server is configured to transmit the encrypted ballot ($ebal_i$) and the ephemeral key ($Q_i$) to the moderator server;

(ix) the moderator server is configured to encrypt the blind factor ($b_i$) to generate an encrypted blind factor ($eb_i$);

(x) the moderator server is configured to transmit the encrypted ballot ($ebal_i$), the ephemeral key ($Q_i$), and the encrypted blind factor ($eb_i$) to the voter client;

(xi) the voter client is configured to decrypt the encrypted blind factor ($eb_i$) to recover the blind factor ($b_i$);

(xii) the voter client is configured to regenerate the ballot encryption key ($k_i$);

(xiii) the voter client is configured to decrypt the encrypted ballot ($ebal_i$) to recover the ballot ($bal_i$);

(xiv) the voter client, in response to the voter selecting a desired candidate, is configured to generate a ballot associated with a vote ($B_i$);

(xv) the voter client is configured to double-encrypt the ballot ($B_i$) using a public key of the registrar server ($y_r$) and a public key of the moderator server ($y_m$) as: $B_i = (g^v, T \cdot (y_r \cdot y_m)^v) = (c_3, c_4)$, where g is a generator of G and G is a publicly chosen multiplicative cyclic group of prime order p;

where $v \in \mathbb{Z}^*_p$ is selected randomly, $T = (bal_i \| Vote)$;

where $Vote = (cand_1, cand_2, \ldots, cand_m)$ is a sequence of bits representing each candidate such that:

$$cand_k = \begin{cases} 1, & \text{if voting for } cand_k \\ 0, & \text{if voting against } cand_k \end{cases};$$

(xvi) the voter client is configured to connect with a blockchain network and call a smart contract from the blockchain network; and (xvii) the voter client is configured to integrate the double-encrypted ballot ($B_i$) as an input to the smart contract.

2. The control system of claim 1, wherein the public key of the voter ($y_i$) is computed from a voter secret key ($x_i$) as $y_i = g^{x_i} \pmod{p}$ where $x_i \in \mathbb{Z}^*_p$.

3. The control system of claim 1, where $b_i \in \mathbb{Z}^*_p$ and the obscured voter public key ($y'_i$) is computed as $y'_i = y_i^{b_i} = g^{x_i b_i} \pmod{p}$ where $x_i$ is a voter secret key.

4. The control system of claim 1, where the encryption key ($k_i$) is derived as $k_i = (y'_i)^{q_i} = g^{x_i b_i q_i} \pmod{p}$ where $q_i \in \mathbb{Z}^*_p$, and where $x_i$ is a voter secret key.

5. The control system of claim 1, where the encrypted ballot ($ebal_i$) is generated as $ebal_i = \text{AES-Enc}_{k_i}(bal_i)$ where AES-Enc is the AES encryption function.

6. The control system of claim 1, where the ephemeral key ($Q_i$) is generated as $Q_i = g^{q_i} \pmod{p}$ where $q_i \in \mathbb{Z}^*_p$.

7. The control system of claim 1, wherein the encrypted blind factor ($ebal_i$) is generated as $ebal_i = (g^{r_m}, b_i \cdot y_i^{r_m}) = (c_1, c_2)$, where $r_m \in \mathbb{Z}^*_p$.

8. The control system of claim 1, wherein the encrypted blind factor ($eb_i$) is decrypted to recover the blind factor ($b_i$) as $b_i = c_2 \cdot c_1^{-x_i} = b_i \cdot y_i^{r_m} \cdot (g^{r_m})^{-x_i}$ where $x_i$ is a voter secret key.

9. The control system of claim 1, wherein the public key of the registrar server ($y_r$) is computed from a secret key of the registrar server ($x_r$) as $y_r = g^{x_r} \pmod{p}$ where $x_r \in \mathbb{Z}^*_p$, and wherein the public key of the moderator server ($y_m$) is computed from a secret key of the moderator server ($x_m$) as $y_m = g^{x_m} \pmod{p}$.

10. The control system of claim 9, further comprising a tallying server wherein:

(i) the tallying server is configured to receive the secret key of the registrar server ($xx$) and the secret key of the moderator server ($x_m$);

(ii) the tallying server is configured to retrieve the double-encrypted ballots ($B_i$) from the blockchain network; and (iii) the tallying server is configured to decrypt the double-encrypted ballots as $T = c_4 \cdot c_3^{-x_m} \cdot c_3^{-x_r} = T \cdot (y_r \cdot y_m)^v \cdot (g^v)^{-x_m} \cdot (g^v)^{-x_r}$.

11. The control system of claim 1, wherein the voter client is configured to receive a confirmation of the vote and a transaction hash reference from the blockchain network.

12. The control system of claim 1, wherein a registrar has control over the registrar server and a moderator has control over the moderator server, and wherein the registrar and the moderator are opposing political parties.

13. A system for conducting an election, the system comprising:

(a) a voter client configured to be used by a voter to cast a vote for a candidate;

(b) a registrar server; and (c) a moderator server;

wherein:

(i) the voter client is configured to compute a voter public key using a randomly selected voter secret key;

(ii) the voter client is configured to transmit the voter public key to the registrar server;

(iii) the registrar server is configured to sign the voter public key using a registrar public key to create a signature;

(iv) the registrar server is configured to transmit the signature to the voter client;

(v) the registrar server is configured to generate a set of digital ballots;

(vi) the voter client is configured to transmit the voter public key and its signature to the moderator server;

(vii) the moderator server is configured to verify eligibility of the voter using the voter public key and its signature;

(viii) in response to the moderator server verifying the eligibility of the voter, the moderator server is configured to anonymize the voter by computing an obscured voter public key using a blind factor;

(ix) the moderator server is configured to transmit the obscured voter public key to the registrar server;

(x) the registrar server is configured to randomly assign a ballot from the set of digital ballots to the obscured voter;

(xi) the registrar server is configured to encrypt the ballot to generate an encrypted ballot using a ballot encryption key;

(xii) the registrar server is configured to transmit the encrypted ballot and an ephemeral key to the moderator server;

(xiii) the moderator server is configured to encrypt the blind factor to generate an encrypted blind factor; and (xiv) the moderator server is configured to transmit the encrypted ballot, the ephemeral key, and the encrypted blind factor to the voter client.

14. The system of claim 13, wherein:

(i) the voter client is configured to decrypt the encrypted blind factor to recover the blind factor;

(ii) the voter client is configured to regenerate the ballot encryption key using the blind factor, the voter secret key, and the ephemeral key;

(iii) the voter client is configured to decrypt the encrypted ballot to recover the ballot using the AES decryption function and the ballot encryption key;

(iv) the voter client is configured to allow the voter to vote for a desired candidate;

(v) the voter client, in response to the voter selecting the desired candidate, is configured to generate a ballot associated with a vote;

(vi) the voter client is configured to encrypt the ballot using the registrar public key and a moderator public key;

(vii) the voter client is configured to connect with a blockchain network and call a smart contract from the blockchain network; and (viii) the voter client is configured to input the encrypted ballot to the smart contract.

15. The system of claim 14, further comprising a tallying server wherein:

(i) the tallying server is configured to receive a secret key of the registrar server and a secret key of the moderator server;

(ii) the tallying server is configured to retrieve the encrypted ballot from the blockchain network; and (iii) the tallying server is configured to decrypt the encrypted ballot using the registrar secret key and the moderator secret key.

16. The system of claim 15, wherein:

(i) the registrar server is configured to transmit to the tallying server the set of digital ballots distributed among all the voters;

(ii) the tallying server is configured to determine whether a decrypted ballot is an element of the set of digital ballots; and (iii) in response to the decrypted ballot being an element of the set of digital ballots, the tallying server is configured to examine the vote in the decrypted ballot and increment a counter for each candidate accordingly.

17. A method for conducting an election, the method comprising:

(a) encrypting, by a registrar server, a ballot to generate an encrypted ballot;

(b) transmitting, by the registrar server, the encrypted ballot to a moderator server;

(c) transmitting, by the moderator server, the encrypted ballot to a voter client;

(d) decrypting, by the voter client, the encrypted ballot to recover the ballot;

(e) in response to the voter selecting a desired candidate, generating, by the voter client, a ballot associated with a vote; and (f) encrypting, by the voter client, the ballot associated with a vote using a public key of the registrar server and a public key of the moderator server:

(g) connecting, by the voter client, with a blockchain network and calling a smart contract from the blockchain network, and (h) integrating, by the voter client, the encrypted ballot as an input to the smart contract.

18. The method of claim 17, further comprising:

(a) receiving, by a tallying server, a secret key from the registrar server and a secret key from the moderator server;

(b) retrieving, by the tallying server, the encrypted ballot from the blockchain network; and (c) decrypting, by the tallying server, the encrypted ballot using the registrar secret key and the moderator secret key.

19. The method of claim 17, wherein a registrar has control over the registrar server and a moderator has control over the moderator server, and wherein the registrar and the moderator are opposing political parties.

20. A voting computer program, stored in a non-transitory computer-readable medium, including programmed instructions comprising:

(a) transmitting, by a first set of instructions stored on a voter client, a voter public key ($y_i$) to a moderator server, the voter client configured to be used by a voter to cast a vote for a candidate;

(b) verifying, by a second set of instructions stored on the moderator server, the eligibility of the voter, and in response to determining the voter is eligible to vote, obscuring, by the second set of instructions, the identity of the voter by computing an obscured voter public key ($y'_i$);

(c) transmitting, by the second set of instructions, the obscured voter public key ($y'_i$) to a registrar server;

(d) randomly assigning, by a third set of instructions stored on the registrar server, a ballot ($bal_i$) from a set of digitally-signed ballots ($\mathcal{B}$) to the obscured voter;

(e) encrypting, by the third set of instructions, the ballot ($bal_i$) to generate an encrypted ballot ($ebal_i$);

(f) transmitting, by the third set of instructions, the encrypted ballot ($ebal_i$) to the moderator server;

(g) transmitting, by the second set of instructions, the encrypted ballot ($ebal_i$), to the voter client;

(h) decrypting, by the first set of instructions, the encrypted ballot ($ebal_i$) to recover the ballot ($bal_i$);

(i) in response to the voter selecting a desired candidate, generating, by the first set of instructions, a ballot associated with a vote ($B_i$); and (j) encrypting, by the first set of instructions, the ballot ($B_i$) using a public key of the registrar server ($y_r$) and a public key of the moderator server ($y_m$).

21. The voting computer program of claim 20, wherein encrypting the ballot ($B_i$) by the first set of instructions is computed as: $B_i=(g^v, T \cdot (y_r \cdot y_m)^v)=(c_3, c_4)$; where g is a generator of G and G is a publicly chosen multiplicative cyclic group of prime order p; where $v \in \mathbb{Z}^*_p$ is selected randomly, $T=(bal_i \| Vote)$; and where $Vote=(cand_1, cand_2, \ldots, cand_m)$ is a sequence of bits representing each candidate such that:

$$cand_k = \begin{cases} 1, & \text{if voting for } cand_k, \\ 0, & \text{if voting against } cand_k. \end{cases}$$

22. The voting computer program of claim 20, further comprising:

(a) connecting, by the first set of instructions, with a blockchain network and calling a smart contract from the blockchain network; and (b) integrating, by the first set of instructions, the encrypted ballot (Bi) as an input to the smart contract.

23. The voting computer program of claim 22, further comprising:

(a) receiving, by a fourth set of instructions on a tallying server, a secret key ($x_r$) from the registrar server and a secret key ($x_m$) from the moderator server;

(b) retrieving, by the fourth set of instructions, the encrypted ballots from the blockchain network; and (c) decrypting, by the fourth set of instructions, the encrypted ballots as $T = c_4 \cdot c_3^{-x_m} \cdot c_3^{-x_r} = T \cdot (y_r \cdot y_m)^v \cdot (g^v)^{-x_m} \cdot (g^v)^{-x_r}$.

\* \* \* \* \*